(12) United States Patent
Szczepanek et al.

(10) Patent No.: US 7,126,740 B2
(45) Date of Patent: Oct. 24, 2006

(54) MULTIFUNCTIONAL OPTICAL DEVICE HAVING A SPATIAL LIGHT MODULATOR WITH AN ARRAY OF MICROMIRRORS

(75) Inventors: Paul Szczepanek, Middletown, CT (US); John A. Moon, Wallingford, CT (US); Alan D. Kersey, S. Glastonbury, CT (US); James S. Sirkis, Wallingford, CT (US); James R. Dunphy, S. Glastonbury, CT (US); Joseph Pinto, Wallingford, CT (US); Christian O'Keefe, Durham, CT (US); Michael A. Davis, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/353,772

(22) Filed: Jan. 28, 2003

(65) Prior Publication Data

US 2004/0008401 A1    Jan. 15, 2004

Related U.S. Application Data

(63) Continuation-in-part of application No. 10/327,695, filed on Dec. 19, 2002, now Pat. No. 6,956,687, and a continuation-in-part of application No. 10/298,264, filed on Nov. 15, 2002, now Pat. No. 6,934,069, and a continuation-in-part of application No. 10/255,141, filed on Sep. 25, 2002, now abandoned, and a continuation-in-part of application No. 10/255,133, filed on Sep. 25, 2002, and a continuation-in-part of application No. 10/255,132, filed on Sep. 25, 2002, now Pat. No. 6,922,277, and a continuation-in-part of application No. 10/255,129, filed on Sep. 25, 2002, now abandoned, and a continuation-in-part of application No. 10/216,000, filed on Aug. 8, 2002, and a continuation-in-part of application No. 10/120,617, filed on Apr. 11, 2002, now abandoned, and a continuation-in-part of application No. 10/115,648, filed on Apr. 3, 2002, and a continuation-in-part of application No. 10/115,647, filed on Apr. 3, 2002.

(60) Provisional application No. 60/365,741, filed on Mar. 18, 2002, provisional application No. 60/365,682, filed on Mar. 18, 2002, provisional application No. 60/365,461, filed on Mar. 18, 2002, provisional application No. 60/365,446, filed on Mar. 18, 2002, provisional application No. 60/354,794, filed on Feb. 6, 2002, provisional application No. 60/352,297, filed on Jan. 28, 2002, provisional application No. 60/344,585, filed on Dec. 28, 2001, provisional application No. 60/332,319, filed on Nov. 16, 2001, provisional application No. 60/332,318, filed on Nov. 16, 2001, provisional application No. 60/325,068, filed on Sep. 25, 2001, provisional application No. 60/325,066, filed on Sep. 25, 2001, provisional application No. 60/325,065, filed on Sep. 25, 2001, provisional application No. 60/325,064, filed on Sep. 25, 2001, provisional application No. 60/310,991, filed on Aug. 9, 2001, provisional application No. 60/311,002, filed on Aug. 8, 2001, provisional application No. 60/283,197, filed on Apr. 11, 2001, provisional application No. 60/281,079, filed on Apr. 3, 2001.

(51) Int. Cl.
*G02B 26/00* (2006.01)

(52) U.S. Cl. .................. 359/290; 359/298; 385/18; 398/81; 398/86; 398/87; 398/88

(58) Field of Classification Search ............ 359/290, 359/301, 302, 315, 318, 320, 618, 629, 634, 359/639, 850, 872, 223–224, 291, 107, 108, 359/298; 385/11, 15–18, 24, 1–3, 31, 10, 385/36, 37; 398/86–88, 81, 82, 84
See application file for complete search history.

(56) References Cited

U.S. PATENT DOCUMENTS

| | | | |
|---|---|---|---|
| 4,626,066 A | 12/1986 | Levinson | 385/22 |
| 4,799,795 A | 1/1989 | Fateley | 356/310 |
| 4,819,084 A | 4/1989 | Bark | 358/296 |
| 5,121,239 A | 6/1992 | Post | 352/272 |

| | | |
|---|---|---|
| 5,158,420 A | 10/1992 | Weyer .................... 414/694 |
| 5,166,766 A | 11/1992 | Grudkowski et al. ......... 257/15 |
| 5,271,078 A | 12/1993 | Franz et al. |
| 5,504,575 A | 4/1996 | Stafford .................. 356/330 |
| 5,699,462 A | 12/1997 | Fouquet et al. ............. 385/18 |
| 5,729,386 A | 3/1998 | Hwang .................... 359/618 |
| 5,774,604 A | 6/1998 | McDonald ................. 385/18 |
| 5,915,063 A | 6/1999 | Colbourne et al. ......... 385/140 |
| 6,128,077 A | 10/2000 | Jovin et al. .............. 356/330 |
| 6,128,078 A | 10/2000 | Fateley |
| 6,160,928 A | 12/2000 | Schroeder ................ 385/18 |
| 6,204,946 B1* | 3/2001 | Aksyuk et al. ............. 398/9 |
| 6,222,954 B1* | 4/2001 | Riza ...................... 385/18 |
| 6,246,818 B1 | 6/2001 | Fukushima ................ 385/47 |
| 6,263,123 B1 | 7/2001 | Bishop et al. |
| 6,263,127 B1 | 7/2001 | Dragone et al. ............ 385/24 |
| 6,304,688 B1 | 10/2001 | Korn et al. |
| 6,434,291 B1 | 8/2002 | Kessler et al. ............. 385/24 |
| 6,459,484 B1 | 10/2002 | Yokoi ..................... 356/318 |
| 6,525,863 B1 | 2/2003 | Riza ...................... 359/290 |
| 6,636,654 B1* | 10/2003 | McGuire, Jr. ............. 385/17 |
| 6,647,164 B1* | 11/2003 | Weaver et al. ............ 385/16 |
| 2001/0046350 A1 | 11/2001 | Tedesco |
| 2002/0009257 A1 | 1/2002 | Bouevitch et al. |
| 2002/0081070 A1 | 6/2002 | Tew |

FOREIGN PATENT DOCUMENTS

| | | |
|---|---|---|
| EP | 1 052 868 A2 | 11/2000 |
| WO | WO 01/11419 A2 | 2/2001 |
| WO | WO 02/082165 A2 | 10/2002 |
| WO | WO 02/082166 A2 | 10/2002 |

OTHER PUBLICATIONS

S. Yuan et al., "General Formula for Coupling-loss Characterization of Single-Mode Fiber Collimators by Use of Gradient-Index Rod Lenses, Applied Optics", vol. 38. No. 15, May 20, 1999, pp. 3214-3222.

N. Riza, "Reconfigurable Optical Wireless", IEEE Lasers and Electro-Optics Society 1999 Annual Meeting, vol. 1, pp. 70-71.

N. Riza et al., "Digitally Controlled Fault-Tolerant Multiwavelength Programmable Fiber-Optic Attenuator Using a Two-Dimensional Digital Micromirror Device", 1999 Optical Society of America.

N. Riza et al., "Multiwavelength Three Dimesional 2X2 Fiber-Optic Switch Structure Using Small Tilt Micro-Mirrors", SPIE vol. 3749, pp. 470-471.

G. Love, "Liquid-crystal Phase Modulator For Unpolarized Light", Applied Optics, vol. 32, No. 13, May 1, 1993, pp. 2222-2223.

N. Riza et al., "Synchronous Amplitude and Time Control for an Optimum Dynamic Range Variable Photonic Delay Line", Applied Optics, vol. 38, No. 11, Apr. 10, 1999, 2309-2318.

N. Riza et al., "Robust Packaging of Photonic RF Modules Using Ultra-Thin Adaptive Optical Interconnect Devices", SPIE vol. 3160, pp. 170-176.

N. Riza et al., "Demonstration of a Liquid-crystal adaptive alignment tweeker for high-speed Infrared Band Fiber-Fed Free-space Systems", Opt. Eng. 37(6), Jun. 1998, 1876-1880.

M. D. Johnson et al., "Two-axis Micromirror Scanner", SPIE vol. 3787, Jul. 1999, pp. 88-95.

H. Laor et al., "Performance of a 576X576 Optical Cross Connect", National Fiber Optic Engineers Conference, Sep. 26-30, 1999, pp. 276-281.

* cited by examiner

*Primary Examiner*—Hung Xuan Dang
*Assistant Examiner*—Joseph Martinez

(57) ABSTRACT

A reconfigurable multifunctional optical device has an optical arrangement for receiving an optical signal, each having optical bands or channels, and a spatial light modulator for reflecting the at least one optical signal provided thereon. The optical arrangement features a free optics configuration with a light dispersion element for spreading each optical signal into one or more respective optical bands or channels for performing separate optical functions on each optical signal. The spatial light modulator includes a micro-mirror device with an array of micro-mirrors, and the respective optical bands or channels reflect off respective micro-mirrors. The free optics configuration includes a common set of optical components for performing each separate optical function on each optical signal. The separate optical functions reflect off separate non-overlapping areas on the spatial light modulator. The separate optical functions include optical switching, conditioning or monitoring functions.

51 Claims, 26 Drawing Sheets

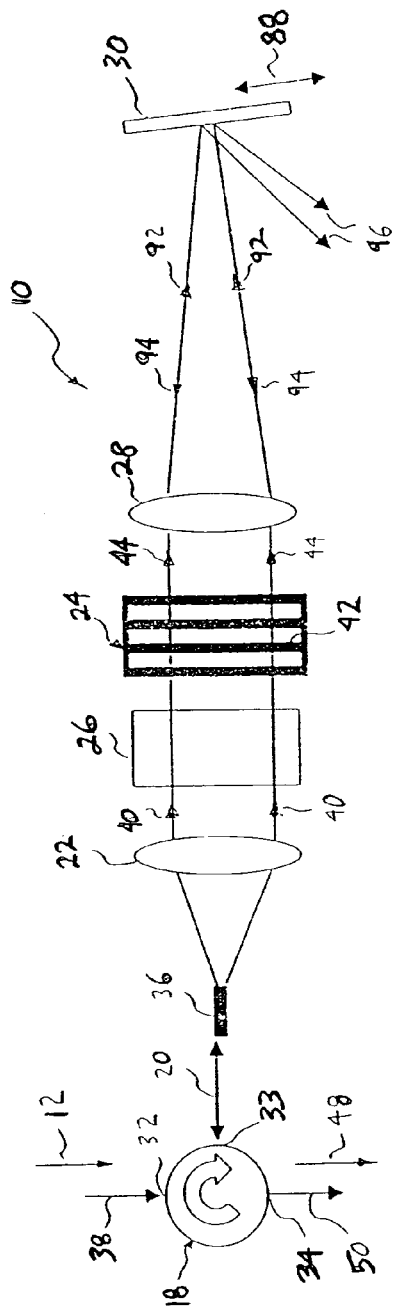
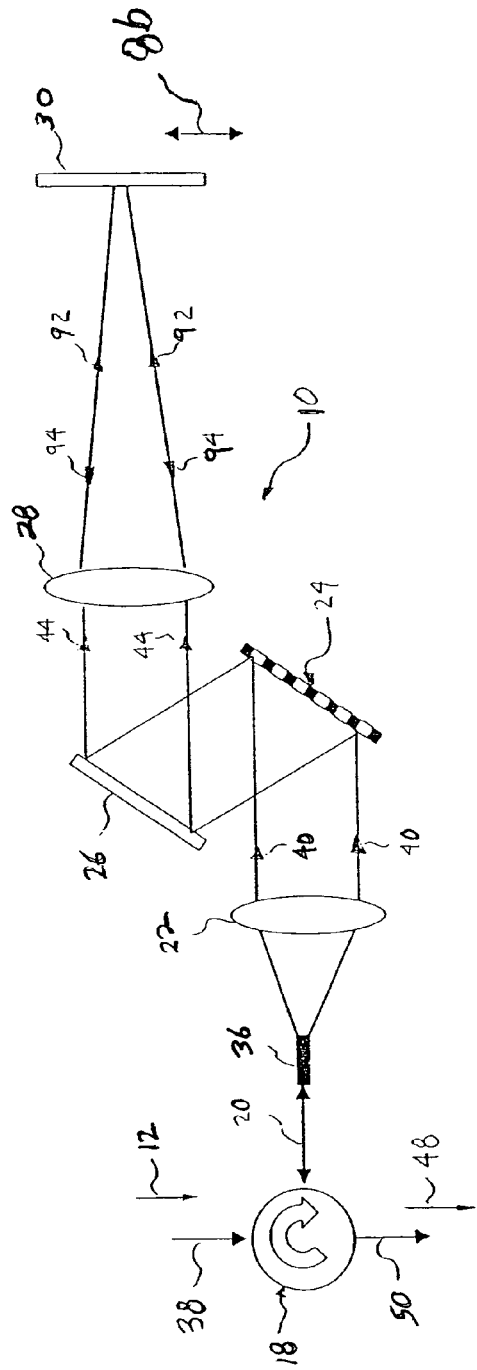
Fig. 1
Fig. 2

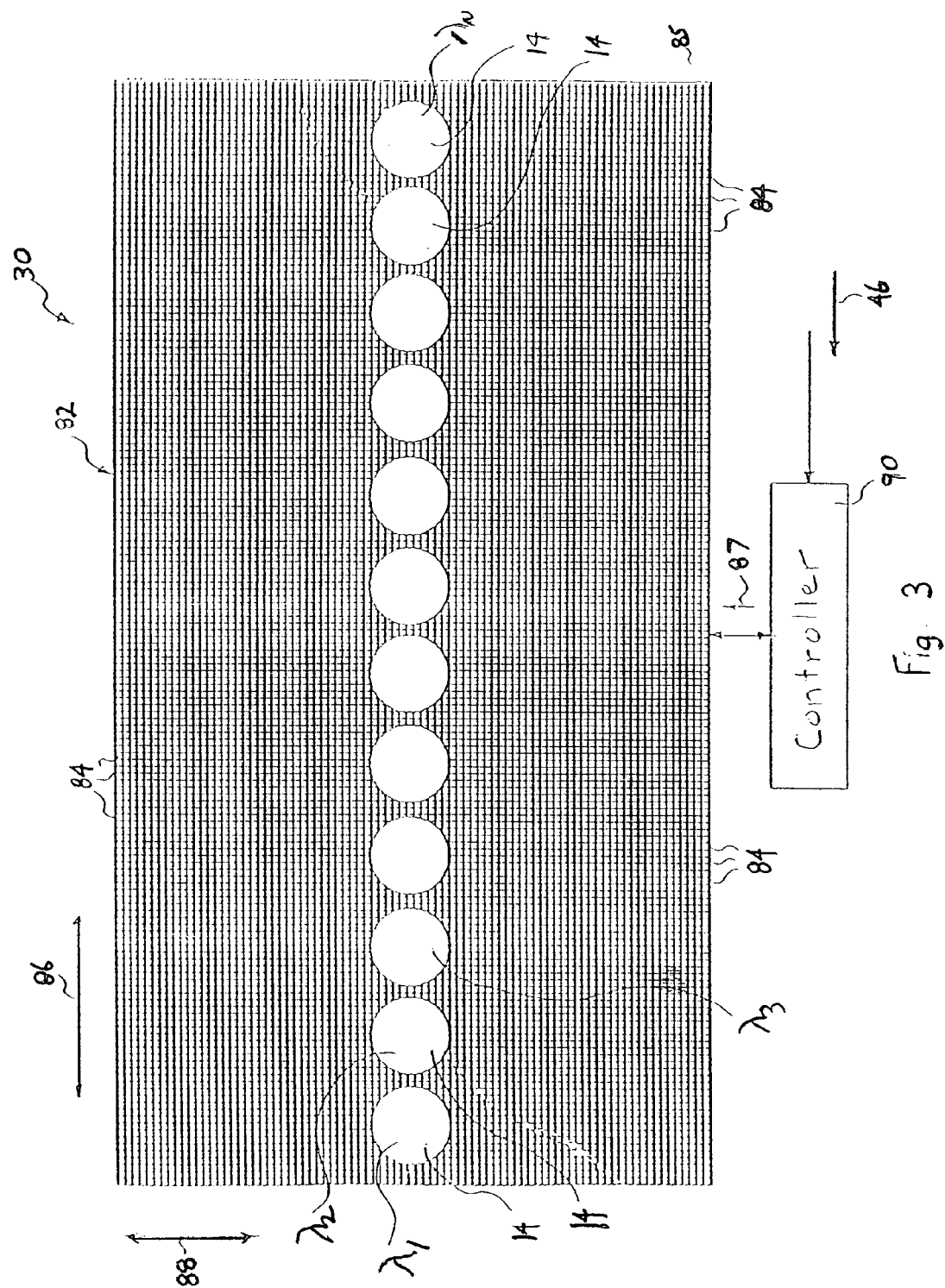

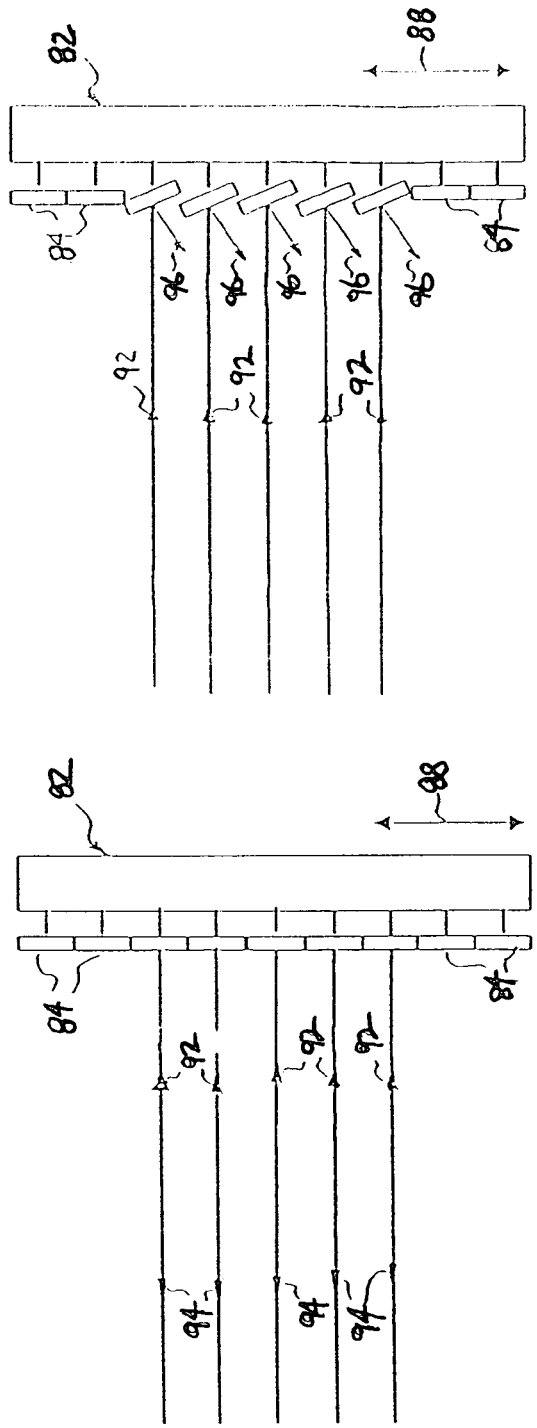
Fig. 4b
Fig. 4a
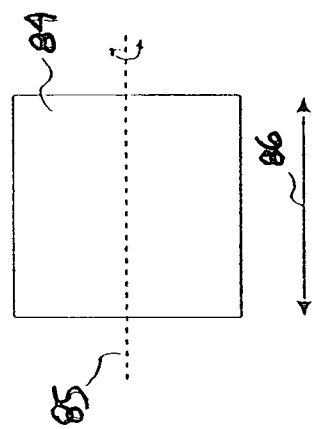
Fig. 5

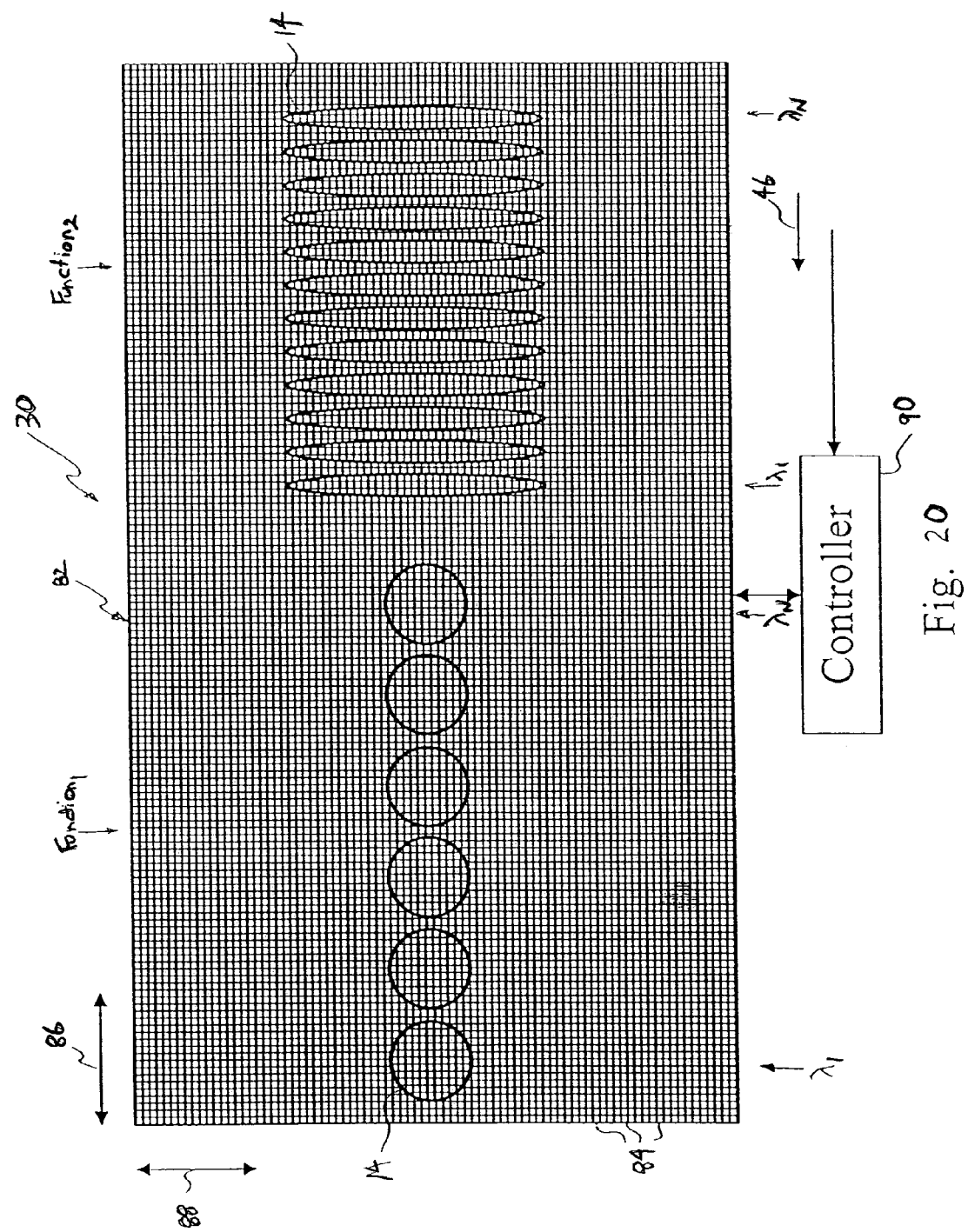

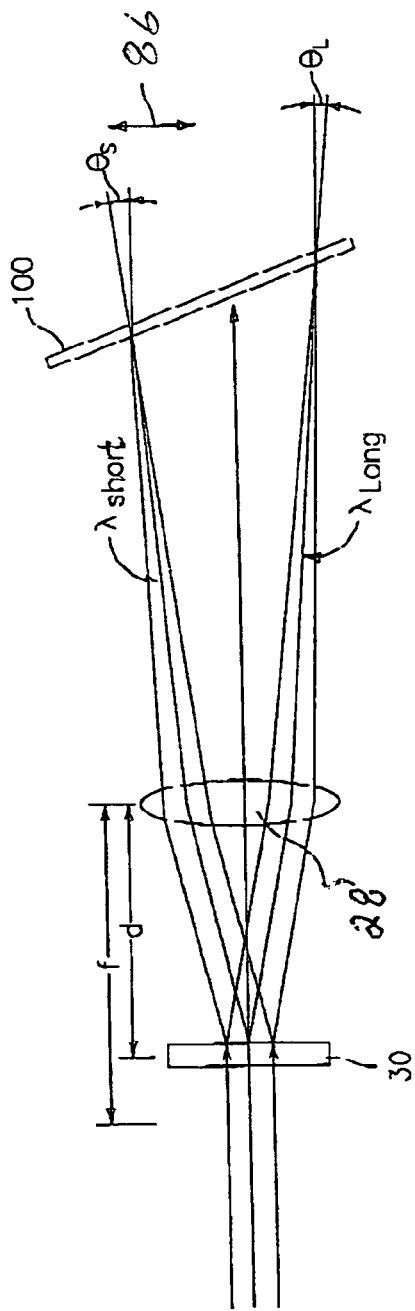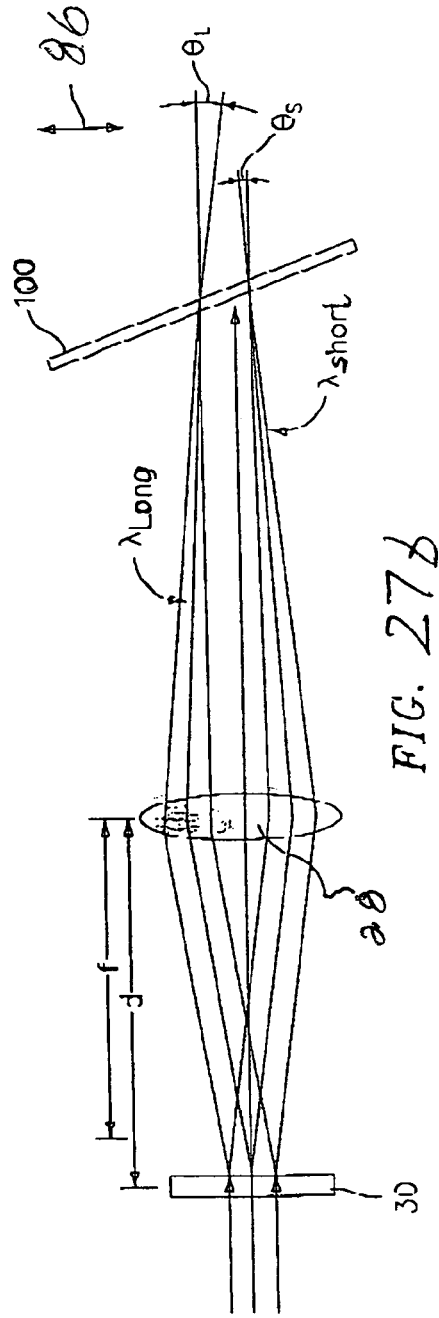
FIG. 27a
FIG. 27b

MULTIFUNCTIONAL OPTICAL DEVICE HAVING A SPATIAL LIGHT MODULATOR WITH AN ARRAY OF MICROMIRRORS

CROSS REFERENCE TO RELATED APPLICATIONS

This patent claims the benefit of U.S. Provisional Patent Application Ser. No. 60/352,297, filed Jan. 28, 2002; and is a continuation-in-part of U.S. patent application Ser. No. 10/115,647, filed Apr. 3, 2002, which claims the benefit of U.S. Provisional Patent Application Ser. No. 60/281,079, filed Apr. 3, 2001, U.S. Provisional Patent Application Ser. No. 60/311,002, filed Aug. 8, 2001, U.S. Provisional Patent Application Ser. No. 60/332,319, filed Nov. 16, 2001 U.S. Provisional Patent Application Ser. No. 60/365,741, filed Mar. 18, 2002, and U.S. Provisional Patent Application Ser. No. 60/365,461, filed Mar. 18, 2002; and is a continuation-in-part of U.S. patent application Ser. No. 10/120,617, filed Apr. 11, 2002 now abandoned, which claims the benefit of U.S. Provisional Patent Application Ser. No. 60/283,197, filed Apr. 11, 2001; and is a continuation-in-part of U.S. patent application Ser. No. 10/115,648, filed Apr. 3, 2002, which claims the benefit of U.S. Provisional Patent Application Ser. No. 60/365,682, filed Mar. 18, 2002, and U.S. Provisional Patent Application Ser. No. 60/365,446, filed Mar. 18, 2002; and is a continuation-in-part of U.S. patent application Ser. No. 10/216,000, filed Aug. 8, 2002, which claims the benefit of U.S. Provisional Patent Application Ser. No. 60/310,991, filed Aug. 9, 2001, and U.S. Provisional Patent Application Ser. No. 60/354,794, filed Feb. 6, 2002; and is a continuation-in-part of U.S. patent application Ser. No. 10/255,141, filed Sep. 25, 2002 now abandoned, which claims the benefit of U.S. Provisional Patent Application Ser. No. 60/325,065, filed Sep. 25, 2001; and is a continuation-in-part of U.S. patent application Ser. No. 10/255,133, filed Sep. 25, 2002, which claims the benefit of U.S. Provisional Patent Application Ser. No. 60/325,066, filed Sep. 25, 2001; and is a continuation-in-part of U.S. patent application Ser. No. 10/255,129, filed Sep. 25, 2002 now abandoned, which claims the benefit of U.S. Provisional Patent Application Ser. No. 60/325,068, filed Sep. 25, 2001; and is a continuation-in-part of U.S. patent application Ser. No. 10/298,264, filed Nov. 16, 2002 now U.S. Pat. No. 6,934,069, which claims the benefit of U.S. Provisional Patent Application Ser. No. 60/332,318, filed Nov. 16, 2001; and is a continuation-in-part of U.S. patent application Ser. No. 10/255,132, filed Sep. 25, 2002 now U.S. Pat. No. 6,922,277, which claims the benefit of U.S. Provisional Patent Application Ser. No. 60/325,064, filed Sep. 25, 2001; and is a continuation-in-part of U.S. patent application Ser. No. 10/327,695, filed Dec. 19, 2002 now U.S. Pat. No. 6,956,687, which claims the benefit of U.S. Provisional Patent Application Ser. No. 60/344,585, filed Dec. 28, 2001, all of which are incorporated herein by reference in their entirety.

BACKGROUND OF THE INVENTION

1. Technical Field

The present invention relates to tunable optical devices, and more particularly to a reconfigurable multifunctional optical device including a spatial light modulator to selectively attenuate, condition and/or redirect at least one optical channel of a wavelength division multiplexing (WDM) optical signal.

2. Description of Related Art

MEMS micro-mirrors have been widely explored and used for optical switching and attenuation applications. The most commonly used application is for optical cross-connect switching. In most cases, individual micro-mirror elements are used to 'steer' a beam (i.e., an optical channel) to a switched port or to deflect the beam to provide attenuation on a channel-by-channel basis. Each system is designed for a particular 'wavelength plan'—e.g. "X" number of channels at a spacing "Y", and therefore each system is not 'scalable' to other wavelength plans.

Further, dynamic gain equalization (or "flattening") is a critical technology for deployment of next-generation optical network systems. Dynamic gain equalizing filters (DGEF's) function by adding varying amounts of attenuation at different spectral locations in the signal spectrum of optical fiber communication systems. For instance, a DGEF may be designed to operate in the "C-band" (~1530–1565 nanometers (nm)) of the communication spectrum that is capable of selectively attenuating spectrally concatenated "bands" of some preselected spectral width (e.g., 3 nm). The total number of bands within the DGEF is determined by the width of an individual band.

In the networking systems, it is often necessary to route different channels (i.e., wavelengths) between one fiber and another using a reconfigurable optical add/drop multiplexer (ROADM) and/or an optical cross-connect device.

One issue with the above optical MEMs device is that it is not "channel plan independent". In other words, each MEMs device is limited to the channel spacing (or channel plan) originally provide. Another concern is that if the absolute value of a channel wavelength changes, a respective optical signal may begin to hit an edge of a corresponding mirror leading to large diffraction losses. Further, since each channel is aligned to an individual mirror, the device must be carefully adjusted during manufacturing and kept in alignment when operated through its full temperature range in the field.

It would be advantageous to provide an optical switching or attenuating device using a spatial light modulator and to combine multiple optical functions using a single spatial light modulator.

SUMMARY OF THE INVENTION

An object of the present invention is to provide a multifunctional optical device using a single spatial light modulator.

The invention provides a new and unique reconfigurable multifunctional optical device comprising an optical arrangement for receiving at least one optical signal, each optical signal having one or more optical bands or channels, and a spatial light modulator for reflecting the at least one optical signal provided thereon. The optical arrangement features a free optics configuration with a light dispersion element for spreading each optical signal into one or more respective optical bands or channels for performing separate optical functions on each optical signal. In one embodiment, the spatial light modulator may include a micro-mirror device with an array of micro-mirrors, and the one or more respective optical bands or channels reflect off a respective plurality of micro-mirrors. In effect, the free optics configuration includes a common set of optical components for performing each separate optical function on each optical signal.

The separate optical functions reflect off separate non-overlapping areas on the spatial light modulator and may include different optical functions. The separate optical functions include optical switching, conditioning or monitoring functions such as either an optical add/drop multiplexer (OADM) function, an optical channel monitor (OCM) function, an optical cross-connect (CC) function, an optical interleaver/deinterleaver (INT/DEINT), a dynamic gain equalization filter (DGEF) or dynamic spectral equalizer (DSE), or some combination thereof. The at least one optical signal typically includes two or more optical input signals, on which a respective function is performed. The scope of the invention is also intended to include performing an optical function on one optical input signal, and performing a second optical function on the output signal from the first optical function.

The one or more light dispersion elements include either a diffraction grating, an optical splitter, a holographic device, a prism, or a combination thereof.

In accordance with an embodiment of the present invention, the multifunctional optical device may include a collimator that collimates a first and second optical input signal. Each of the first and second optical input signals includes a plurality of optical input channels. Each optical input channel is centered at a central wavelength. A light dispersion element substantially separates the optical channels of the collimated first and second input signals. A spatial light modulator reflects each of the first and second optical input channels along a respective first optical path or second optical path, in response to a control signal. The spatial light modulator comprises a micro-mirror device that includes an array of micro-mirrors selectively disposable between a first and a second position in response to the control signal. Each separated optical input channel of each of the first and second input signals is incident on a respective group of micro-mirrors. Each separated optical channel is incident on the respective group of micro-mirrors, wherein each respective separated optical input channel reflects along the respective first optical path when the micro-mirrors are disposed in the first position, or along the respective second optical path when the micro-mirrors are disposed in the second position. A controller generates the control signal in accordance with a switching algorithm.

BRIEF DESCRIPTION OF THE DRAWING

The drawing includes the following Figures:

FIG. 1 is a plan view of a block diagram of a reconfigurable optical filter including a spatial light modulator in accordance with the present invention;

FIG. 2 is a side elevational view of a block diagram of the optical filter of FIG. 1;

FIG. 3 is a block diagram of a spatial light modulator of the optical filter of FIG. 1, wherein the optical channels of a WDM input signal are distinctly projected onto the micromirror device, in accordance with the present invention;

FIG. 4*a* is a pictorial cross-sectional view of the micromirror device of FIG. 3 showing a partial row of micro-mirrors, when the micro-mirrors are disposed in a first position perpendicular to the light beam of the input signal in accordance with the present invention;

FIG. 4*b* is a pictorial cross-sectional view of the micromirror device of FIG. 3 showing a partial row of micro-mirrors, when the micro-mirrors are disposed in a second position non-orthogonal to the light beam of the input signal in accordance with the present invention;

FIG. 5 is a plan view of a micro-mirror of the micromirror device of FIG. 3 in accordance with the present invention;

FIG. 20 is a block diagram of a spatial light modulator of another embodiment of a multifunctional optical device, wherein the optical channels of a WDM input signal are distinctly projected onto the micro-mirror device, in accordance with the present invention;

FIG. 27a is a graphical representation of a portion of the optical filter wherein the grating order causes the shorter wavelengths of light to image onto the micromirror device that is closer than the section illuminated by the longer wavelengths, in accordance with the present invention; and FIG. 27b is a graphical representation of a portion of the optical filter wherein the grating order causes the longer wavelengths of light to image onto the micromirror device that is closer than the section illuminated by the shorter wavelengths in accordance with the present invention.

BEST MODE FOR CARRYING OUT THE INVENTION

Figure 6:
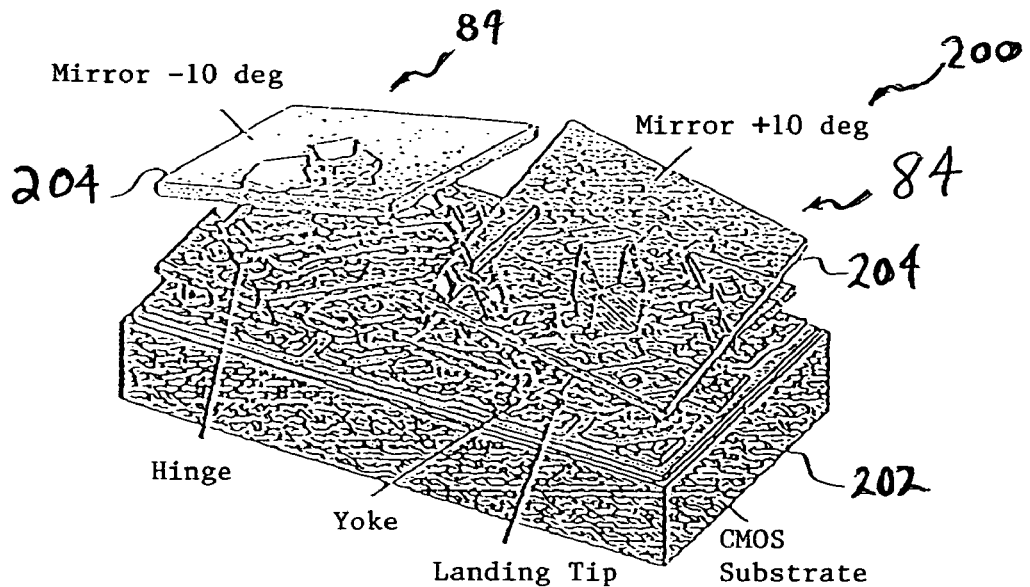
FIG. 6 is a perspective view of a portion of a known micro-mirror device.

The present invention provides a multifunctional optical device that uses a single spatial modulator to provide multiple optical switching and/or conditioning of at least one optical input signal. For example, the optical device may function as both an optical filter and a reconfigurable optical add/drop device (ROADM). Another example is an optical device that may function as an optical channel monitor (OCM) and a dynamic gain equalizer filter (DGEF). In this manner, the functionality of the spatial light modulator can be efficiently utilized. To better understand the specific embodiments of the present invention, a reconfigurable optical filter 10 is first described in FIGS. 1–9, which has a substantial number of components common to the specific multifunctional embodiments.

Referring to FIGS. 1–3, the reconfigurable optical filter 10 selectively filters or attenuates a desired optical channel 14 of light (i.e., a wavelength band) of an optical WDM input signal 12. The optical filter 10 is similar to that shown and described in co-pending U.S. Patent Application Ser. No. 60/281,079, U.S. Patent Application Ser. No. 60/311,002, and U.S. Patent Application Ser. No. 60/525,066, which are incorporated herein by reference in their entirety. Each optical channel 14 (see FIG. 3) of the input signal 12 is centered at a respective channel wavelength ($\lambda_1$, $\lambda_2$, $\lambda_3$, ... $\lambda_N$).

FIG. 1 is a top plan view of the optical filter 10. To better understand the optical filter 10 of FIG. 1, a side elevational view of the filter is illustrated in FIG. 2. As shown in FIG. 2, the optics of the filter 10 is disposed in two tiers or horizontal planes. Specifically, the filter includes a three-port circulator 18, an optical fiber or pigtail 20, a collimator 22, a light dispersive element 24, a mirror 26, and a bulk lens 28 (e.g., a Fourier lens) for directing light to and from a spatial light modulator 30. As shown, the pigtail 20, the collimator 22 and the light dispersive element 24 are disposed in a first tier or horizontal plane. The mirror 26, bulk lens 28 and the spatial light modulator 30 are disposed in the second tier or second horizontal plane which is substantially parallel to the first horizontal plane.

Referring to FIGS. 1 and 2, the three-port circulator 18 directs light from a first port 32 to a second port 33 and from the second port to a third port 34. The optical fiber or pigtail 20 is optically connected to the second port of the circulator 18. A capillary tube 36, which may be formed of glass, is attached to one end of the pigtail 20 such as by epoxying or collapsing the tube onto the pigtail. The circulator 18 at the first port 32 receives the WDM input signal 12 tapped from an optical network (not shown) via optical fiber 38, and directs the input light to the pigtail 20. The input signal 12 exits the pigtail (into free space) and passes through the collimator 22, which collimates the input signal. The collimator 22 may be an aspherical lens, an achromatic lens, a doublet, a GRIN lens, a laser diode doublet or similar collimating lens. The collimated input signal 40 is incident on the light dispersion element 24 (e.g., a diffraction grating or a prism), which separates spatially the optical channels of the collimated input signal 40 by diffracting or dispersing the light from (or through) the light dispersion element.

In one embodiment, the diffraction grating 24 is comprised of a blank of polished fused silica or glass with a reflective coating (such as evaporated gold or aluminum), wherein a plurality of grooves 42 (or lines) are etched, ruled or otherwise formed in the coating. The diffractive grating 24 has a predetermined number of lines, such as 600 lines/mm, 835 lines/mm and 1200 lines/mm. The resolution of the optical filter 10 improves as the number of lines/mm in the grating increases. The grating 24 may be similar to those manufactured by Thermo RGL, part number 3325FS-660 and by Optometrics, part number 3-9601. Alternatively, the diffraction grating may be formed using holographic techniques, as is well known in the art. Further, the light dispersion element may include a prism or optical splitter to disperse the light as the light passes therethrough, or a prism having a reflective surface or coating on its backside to reflect the dispersed light.

As best shown in FIG. 2, the diffraction grating 24 directs the separated light 44 to the mirror 26 disposed in the second tier. The mirror 26 reflects the separated light 44 to the bulk lens 28, which focuses the separated light onto the spatial light modulator 30, as shown in FIG. 3. In response to a switching algorithm and input command 46, the spatial light modulator 30 selectively attenuates at least one optical input channel and reflects the channels (one of which is attenuated) back through the same optical path to the pigtail 20 as indicated by arrows 94, and reflects the attenuated portion of optical input channels away from the bulk lens 28 as indicated by arrows 96, as best shown in FIG. 1. The attenuated and non-attenuated input channels propagate from the second port 33 to the third port 34 of the optical circulator 18 to provide an output signal 48 from optical fiber 50.

As shown in FIG. 3, the spatial light modulator 30 comprises a micro-mirror device 82 having a two-dimensional array of micro-mirrors 84, which cover a surface of the micro-mirror device. The micro-mirrors 84 are generally square and typically 14–20μ wide with 1μ spaces between them. FIG. 4a illustrates a partial row of micro-mirrors 84 of the micro-mirror device 82, when the micro-mirrors are disposed in a first position to reflect the light back along the return path 94 and provide the selected input channel 14 to the optical fiber 50. FIG. 4b illustrates a partial row of micro-mirrors 84 when the micro-mirrors are disposed in a second position, and therefore reflected the attenuated portion of the optical input channels 14 away from the return path, as indicated by arrows 96. The micro-mirrors may operate in a "digital" fashion. In other words, the micro-mirrors either lie flat in a first position, as shown in FIG. 4a, or be tilted, flipped or rotated to a second position, as shown in FIG. 4b.

As described herein before, the positions of the mirrors, either flat or tilted, are described relative to the optical path 92 wherein "flat" refers to the mirror surface positioned orthogonal to the optical path, either coplanar in the first position or parallel as will be more fully described hereinafter. The micro-mirrors flip about an axis 85 parallel to the spectral axis 86, as shown in FIGS. 3 and 5. One will appreciate, however, that the micromirrors may flip about any axis, such as parallel to the spatial axis 88 or at a 45 degrees angle to the spatial axis.

Referring to FIG. 3, the micro-mirrors 84 are individually flipped between the first position and the second position in response to a control signal 87 provided by a controller 90 in accordance with a switching algorithm and an input command 46 from the processing unit 54. The switching algorithm may provide a bit (or pixel) map indicative of the state (flat or tilted) of each of the micro-mirrors 84 of the array to attenuate the desired optical channel(s) 14 to provide the output signal 48 at optical fiber 50 (see FIG. 1), and thus requiring a bit map for each configuration of channels to be dropped. Alternatively, each group of micro-mirrors 84, which reflect a respective optical channel 14, may be individually controlled by flipping the group of micro-mirrors to direct the channel along a desired optical path.

As shown in FIGS. 1 and 4a, the micro-mirror device 82 is oriented to reflect the focused light 92 of the input signal 12 back through the bulk lens 28 to the pigtail 20, as indicated by arrows 94, to provide the output signal 48, when the micro-mirrors 84 are disposed in the first position. As shown in FIGS. 1 and 4b, the focused light 92 reflects away from the bulk lens 28, as indicated by arrows 96. This "digital" mode of operation of the micro-mirrors advantageously eliminates the need for any type of feedback control for each of the micro-mirrors. The micro-mirrors are either "on" or "off" (i.e., first position or second position), respectively, and therefore, can be controlled by simple binary digital logic circuits.

FIG. 3 further illustrates the outline of the optical channels 14 of the optical input signal 12, which are dispersed off the diffraction grating 24 and focused by the bulk lens 28, onto the array of micro-mirrors 84 of the micro-mirror device 82. Each optical channel 14 is distinctly separated from other channels across the spectrum and has a generally circular cross-section, such that the input channels do not substantially overlap when focused onto the spatial light modulator 30. The optical channels have a circular cross-section that project the beam over a multitude of micro-mirrors 84, while keeping the optical channels separated by a predetermined spacing. One will appreciate though that the diffraction grating 24 and bulk lens 28 may be designed to reflect and focus any input channel or group of input channels with any desired cross-sectional geometry, such as elliptical, rectangular, square, polygonal, etc. Regardless of the cross-sectional geometry selected, the cross-sectional area of the channels 14 should illuminate a plurality of micro-mirrors 84, which effectively pixelates the optical channels. In an exemplary embodiment, the cross sectional area of the input channels 14 is generally circular in shape, whereby the spectral width of the optical channel beam spans over approximately 12 micromirrors.

One will appreciate that while the spacing between the channels are predetermined, the spacing between may be non-uniform. For example, one grouping of channels may be spaced to correspond to a 100 GHz spacing, and another group of channels may be spaced to correspond to a 50 GHz spacing.

While the embodiment of an optical filter embodying the present invention described hereinbefore includes optics disposed in two planes, one will appreciate that the optics may be disposed in one plane, as described in co-pending U.S. Patent Application Ser. No. 60/281,079, U.S. Patent Application Ser. No. 60/311,002, and U.S. Patent Application Ser. No. 60/325,066.

The micro-mirror device 82 of FIGS. 1–3 is similar to the Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference.

Figure 7:
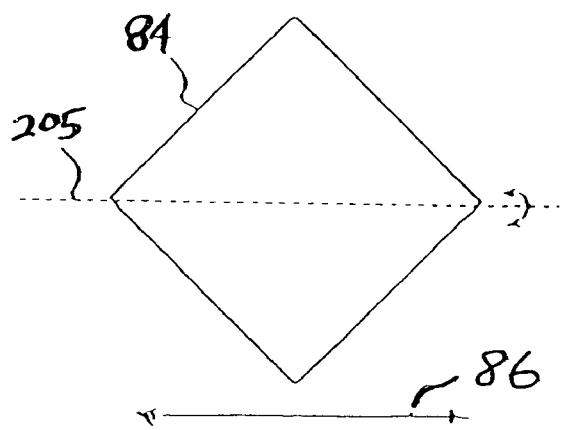
FIG. 7 is a plan view of a micro-mirror of the micromirror device of FIG. 6.

FIG. 6 illustrates a pair of micro-mirrors 84 of a micro-mirror device 200 manufactured by Texas Instruments, namely a digital micromirror device (DMD™). The micro-mirror device 200 is monolithically fabricated by CMOS-like processes over a CMOS memory 202. Each micro-mirror 84 includes an aluminum mirror 204, 16μ square, that can reflect light in one of two directions, depending on the state of the underlying memory cell 202. Rotation, flipping or tilting of the mirror 204 is accomplished through electrostatic attraction produced by voltage differences between the mirror and the underlying memory cell. With the memory cell 202 in the on (1) state, the mirror 204 rotates or tilts approximately +10 degrees. With the memory cell in the off (0) state, the mirror tilts approximately −10 degrees. As shown in FIG. 7, the micro-mirrors 84 flip about an axis 205.

Figure 8B:
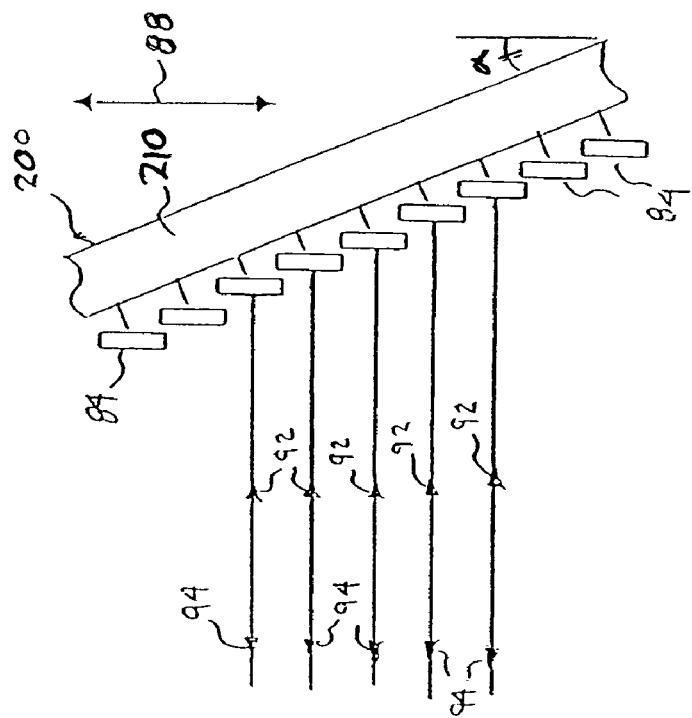
FIG. 8*b* is a pictorial cross-sectional view of the micromirror device of FIG. 6 showing a partial row of micro-mirrors, when the micro-mirrors are disposed in a first position perpendicular to the light beam of the input signal in accordance with the present invention.
Figure 8A:
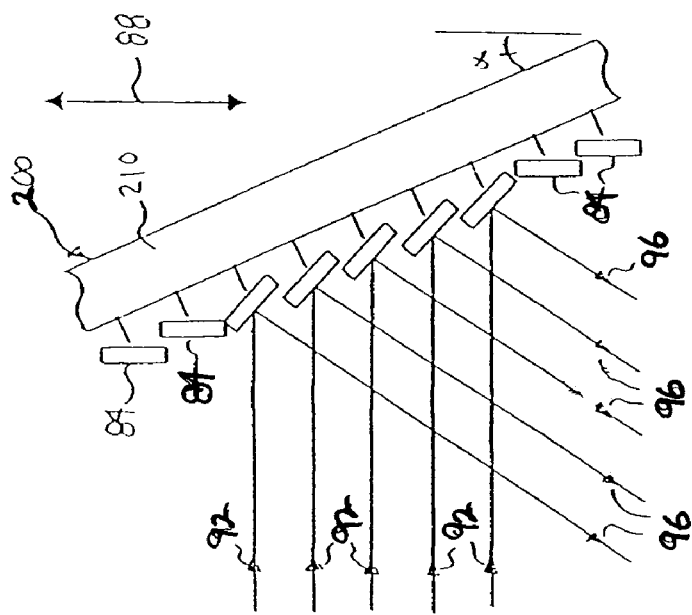
FIG. 8*a* is a pictorial cross-sectional view of the micromirror device of FIG. 6 showing a partial row of micro-mirrors, when the micro-mirrors are disposed in a second position non-orthogonal to the light beam of the input signal in accordance with the present invention.

FIGS. 8a and 8b illustrate the orientation of a micro-mirror device 200 similar to that shown in FIG. 6, wherein neither the first or second position (i.e., on or off state) of the micro-mirrors 84 is parallel to the base or substrate 210 of the micromirror device 200, as shown in FIGS. 4a and 4b. Consequently as shown in FIG. 8a, the base 210 of the micro-mirror device 200 is mounted at a non-orthogonal angle α relative to the collimated light 83 to position the micro-mirrors 84, which are disposed at the first position, perpendicular to the collimated light 44, so that the light reflected off the micro-mirrors in the first position reflect substantially back through the return path, as indicated by arrows 94, to provide the output signal 48 at optical fiber 50. Consequently, the tilt angle of the mirror between the horizontal position and the first position (e.g., 10 degrees) is approximately equal to the angle α of the micro-mirror device. FIG. 8b is illustrative of the micro-mirror device 200 when the micro-mirrors 84 are disposed in the second position to drop an input channel 14 to the output signal 48 at optical fiber 50.

Figure 9A:
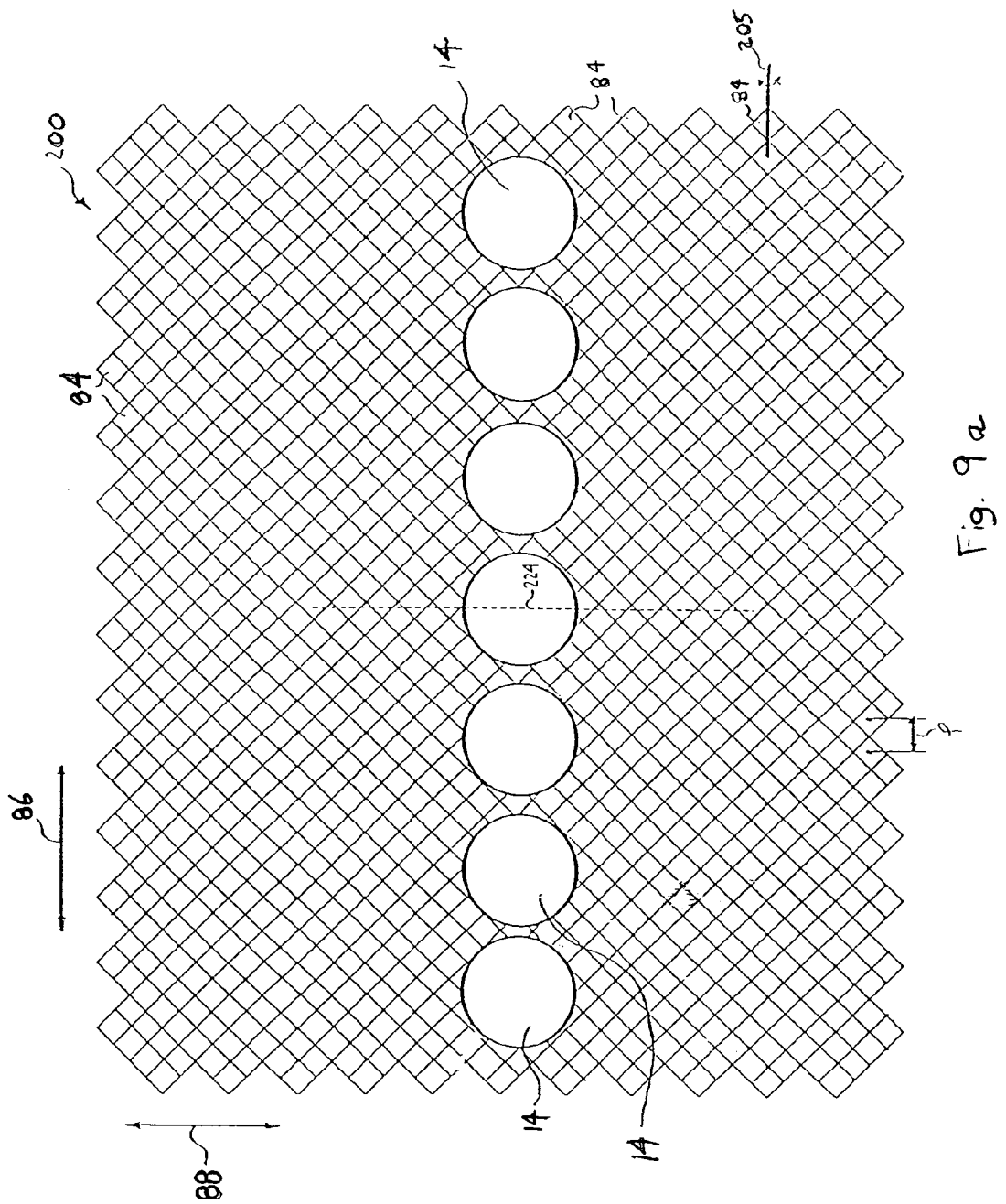
FIG. 9*a* is a pictorial cross-sectional view of the micromirror device of FIG. 6 disposed at a predetermined angle in accordance with the present invention.

As described hereinbefore, the micro-mirrors 84 of the micro-mirror device 200 flip about a diagonal axis 205 as shown in FIGS. 7 and 9a. In an exemplary embodiment of the present invention shown in FIG. 9a, the optical input channels 14 are focused on the micro-mirror device 200 such that the spectral axis 86 of the optical channels 14 is parallel to the tilt axis 205 of the micro-mirrors. This configuration is achieved by rotating the micro-mirror device 45 degrees compared to the configuration shown in FIG. 3. Alternatively, the optical channels 14 may be focused such that the spectral axes 86 of the channels are perpendicular to tilt axis 205 of the micro-mirrors. Further, one will appreciate that the orientation of the tilt axis 205 and the spectral axis 86 may be at any angle.

Figure 9B:
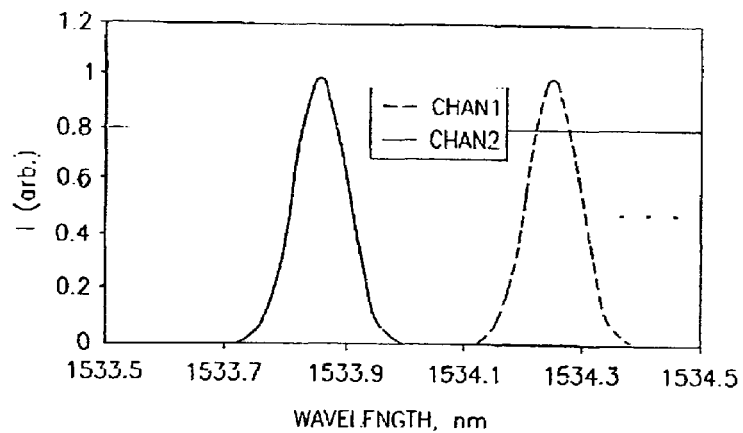
FIG. 9*b* is a plot of the power of the optical channels imaged onto the micromirror device, wherein the optical channels of a WDM input light are substantially dispersed onto the micro-mirror device as shown in FIG. 9*a* in accordance with the present invention.
Figure 9C:
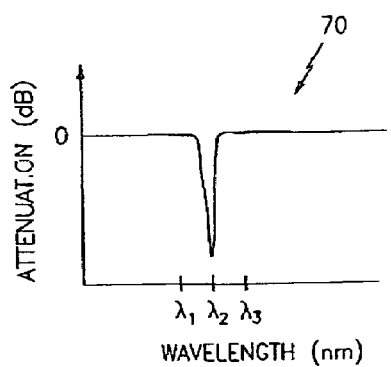
FIG. 9*c* is a graphical representation of a transmission filter function of an optical filter, wherein the optical channels of a WDM input light are substantially dispersed onto the micro-mirror device as shown in FIG. 9*a*, in accordance with the present invention.
Figure 9D:
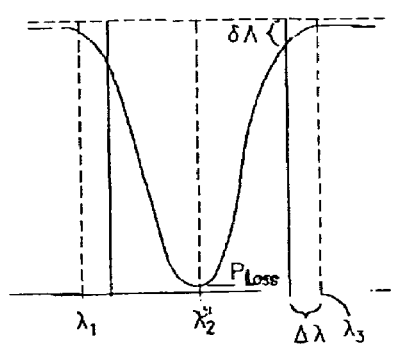
FIG. 9*d* is a plot of attenuation curve when a single channel is dropped from the optical input signal of the optical filter of FIG. 9*a*.

As shown in FIGS. 9a and 9b, the optical channels 14 are dispersed, such that the optical channels do not substantially overlap spectrally when focused onto the spatial light modulator 36. For example, as shown in FIGS. 9a and 9c, the optical channels 14 are sufficiently separated such that when a channel is substantially attenuated or dropped (e.g. approximately 30 dB power loss) the adjacent channels are attenuated less than approximately 0.1% for unmodulated signals and less than approximately 0.2% for a modulated signal. In other words, as shown in FIGS. 9c and 9d, the optical channels are substantially separated and non-overlapping when an optical channel is attenuated or dropped ($P_{LOSS}$) such that the power of the adjacent channel drops less than a predetermined level (dA) at a predetermined delta (§ f) from the center frequency (or wavelength) of the adjacent channels. For example, for a 50 GHz WDM input signal wherein an optical channel at $\lambda_2$ is attenuated ($P_{LOSS}$) greater than 30 dB, the loss (dA) at adjacent channels is approximately less than 0.2 dB at the channel center +/−10 GHz.

Figure 10:
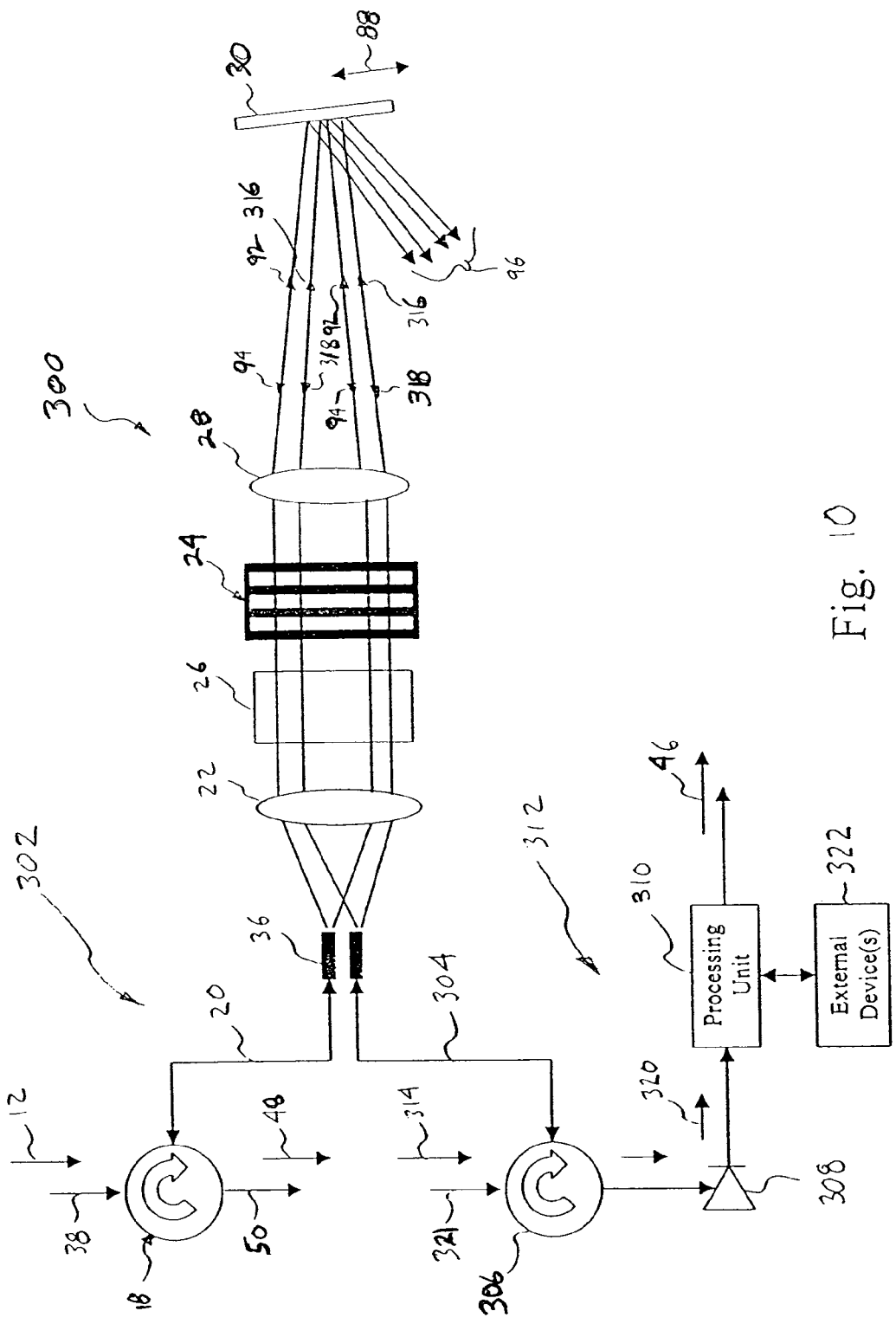
FIG. 10 is a plan view of a block diagram of a reconfigurable multi-function optical device having an OCM function and optical filter function.

In FIG. 10, an embodiment of a multi-functional optical device 300 in accordance with the present invention is shown. The device combines the functions of an optical channel monitor (OCM) and an optical filter using one spatial modulator including a micromirror device. The optical device includes an optical filter portion 302 substantially the same as the optical filter 10 of FIGS. 1–3 described hereinbefore, and therefore like components have the same reference numerals. The functionality of the OCM is added to the filter portion 302 by adding a second pigtail 304, a second circulator 306, a photodetector 308 and a processing unit 310. Not only does the OCM use a common spatial light modulator 30 in this embodiment, the OCM uses common free-space optics, namely the collimator 22, mirror 26, diffraction grating 24 and Fourier lens 28. The OCM portion 312 of the optical device 300 is substantially the same as the OCM described in co-pending U.S. Patent Application Ser. No. 60/325,066, which is incorporated herein by reference in its entirety.

Figure 11:
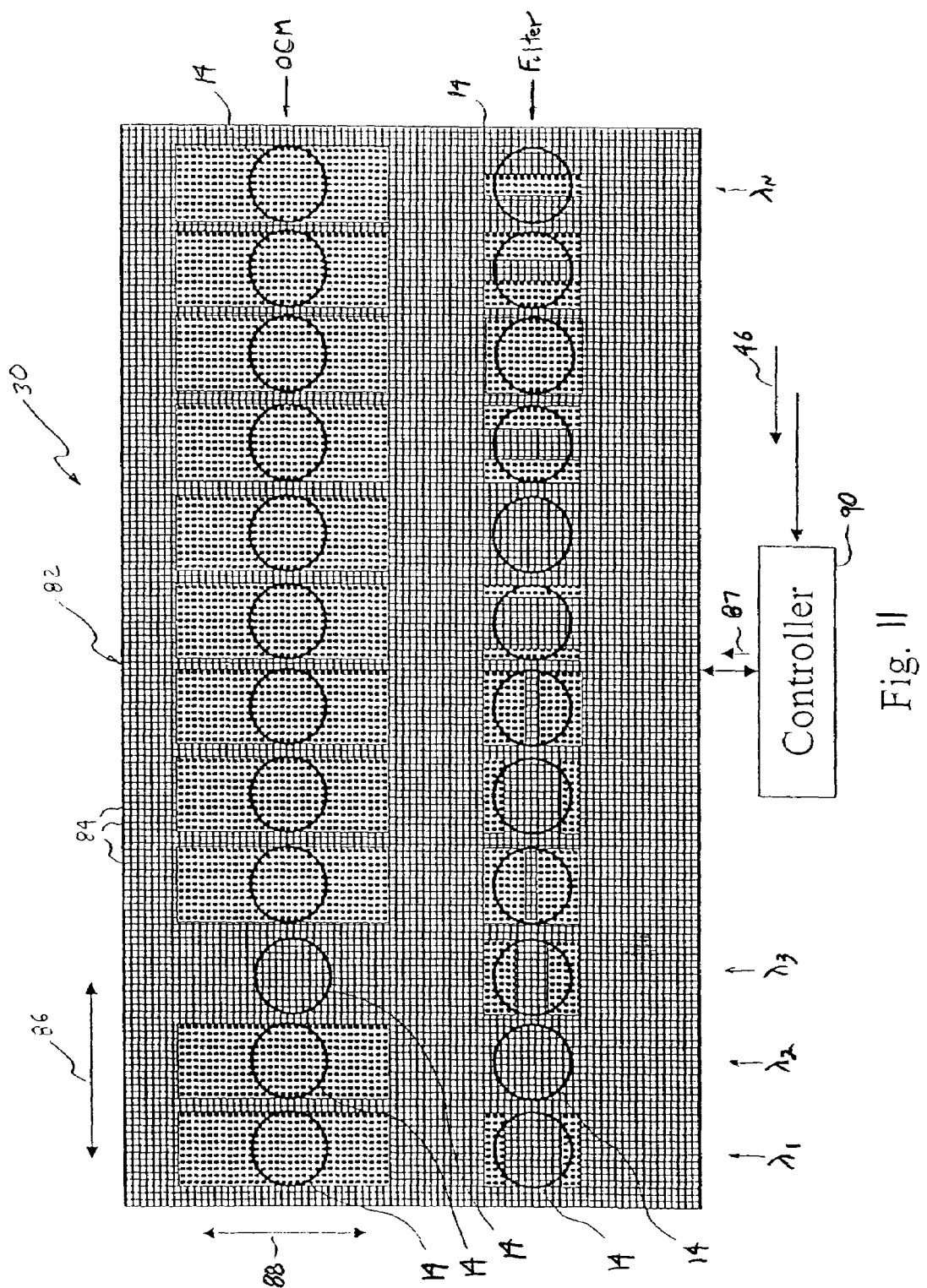
FIG. 11 is a block diagram of the spatial light modulator of FIG. 10, wherein the optical channels of the WDM input signals to the OCM and optical filter are distinctly projected onto the micro-mirror device, in accordance with the present invention.

The ends of the pigtails 20, 304 are spaced in the spatial direction 88 so that the input light 12, 314 of the filter portion 302 and OCM portion 312, respectively, propagate along separate optical paths and intersect the micromirror device 82 in separate non-overlapping areas. As a result, the diffracted light 92, 316 is spaced spatially on the micromirror device 82 as illustrated in FIG. 11. As shown, the diffracted light 316 of the input light 314 of the OCM 312 is spread spectrally over the upper portion of the micromirror device 82, and the diffracted light 92 of the input light 12 of the optical filter 302 is spread spectrally over the lower portion of the micro-mirror device.

For the OCM 304, a portion of the micromirrors are tilted to the second position, as indicated by the black squares, to reflected the optical channels 14 at $\lambda_1$, $\lambda_2$ and $\lambda_4$–$\lambda_N$ away from the return path 318 as indicated by arrows 96. The other micromirrors associated with the optical channel 14 at $\lambda_3$ are tilted to the first position, as indicated by the white squares, to reflect the optical channel at $\lambda_3$ back along the return path 318 to the second pigtail 304. The returned optical channel 14 at $\lambda_3$ passes through the second circulator 306 to the photodetector 308, which provides an electrical signal 320 indicative of the returned optical channel to the processing unit 310. The processing unit provides an output signal to an external device(s) 322 and a control signal 46 to controller 90 of the spatial light modulator 30 to control the flipping of the micromirrors 84 for reflecting any optical channel or channels 14 to the photodetector 308 for sensing.

The optical filter 302 substantially operates as described hereinbefore. As shown in FIG. 11, the micromirrors 84 of the micromirror device 82 are selectively tilted to attenuate at least one optical channel 14. For instance, the optical channel 14 at $\lambda_1$ attenuate the upper and lower portions of the channel by tilting the micromirrors disposed at the upper and lower portions of the channel to the second position, as indicated by the black squares, to reflect the corresponding portions of light away from the return path 94 as indicated by arrows 96. The other micromirrors disposed over the remaining portion of the optical channel 14 at $\lambda_1$ are tilted to the first position, as indicated by the white squares, to reflect that portion of the optical channel back along the return path to the first pigtail 20 to provide an output signal 48 at optical fiber 50. As shown in FIG. 11, any pattern or number of micromirrors may be titled to the second position to attenuate a particular optical channel 14. Further, the present invention contemplates that the micro-mirrors 84 of the optical filter 302 may be tilted to function as a blocking filter as described in U.S. Patent Application Ser. No. 60/344,585, which is incorporated herein by reference in its entirety. Further, it is also contemplated that the micromirrors of the optical filter 302 may be titled to function as a dynamic gain equalization filter (DGEF) as described in U.S. Patent Application Ser. Nos. 60/281,019 and 60/311,002, which are incorporated herein by reference in their entirety.

While the DGEF (or optical filter) 302 and the OCM 312 of the multifunctional device of FIG. 9a operate independently having separate inputs and outputs, the present invention contemplates providing the output 50 of the DGEF to the input 321 of the OCM to provide a closed loop DGEF for a smart node, similar to that described in U.S. Patent Application Ser. No. 60/354,794, which is incorporated herein by reference in its entirety. In the operation, the OCM detects the output signal 48 of the DGEF 302 and provides a feedback signal 46 to the spatial light modulator 30. The controller 90 of FIG. 11 then flips the micromirrors 84 to adjust the attenuate of the channels 14 of the optical channels of the input signal 12 of the DGEF.

Figure 12:
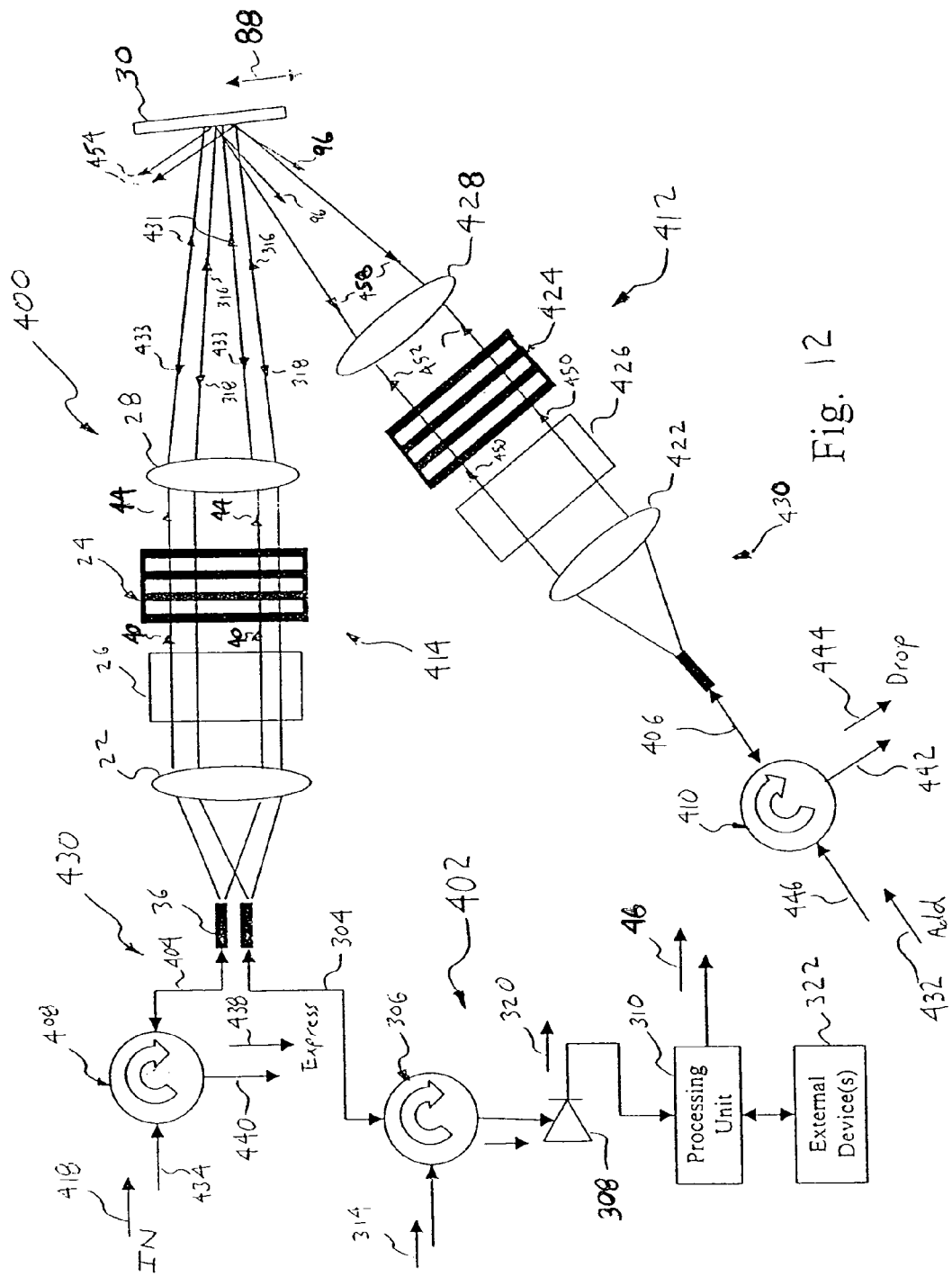
FIG. 12 is a plan view of a block diagram of another multifunction optical device having an OCM function and reconfigurable optical add/drop multiplexer (ROADM) function.

In FIG. 12, an embodiment of a multifunctional optical device 400 in accordance with the present invention is shown. The optical device 400 combines the functions of an optical channel monitor (OCM) and a reconfigurable optical add/drop multiplexer (ROADM) using one spatial modulator 30 including a micromirror device 82. The optical device includes an OCM portion 402 substantially the same as the OCM portion 312 of FIG. 10 described hereinbefore, and therefore like components have the same reference numerals. The functionality of the ROADM is added to the OCM 402 by adding second and third pigtails 404, 406, second and third circulators 408, 410, and a second set of free-space optics 412 similar to the first set of free-space optics 414. The second set of free-space optics includes a collimator 422, a mirror 426, a diffraction grating 424 and a Fourier lens 428. Similar to the optical device 300, both the OCM and ROADM use the first set of free-space optics 414, namely the collimator 22, mirror 26, diffraction grating 24 and Fourier lens 28, and a common spatial light modulator 30. The ROADM portion 430 of the optical device 400 is substantially the same as an ROADM described in co-pending U.S. Patent Application Ser. No. 60/325,065, which is incorporated herein by reference in its entirety.

Figure 13:
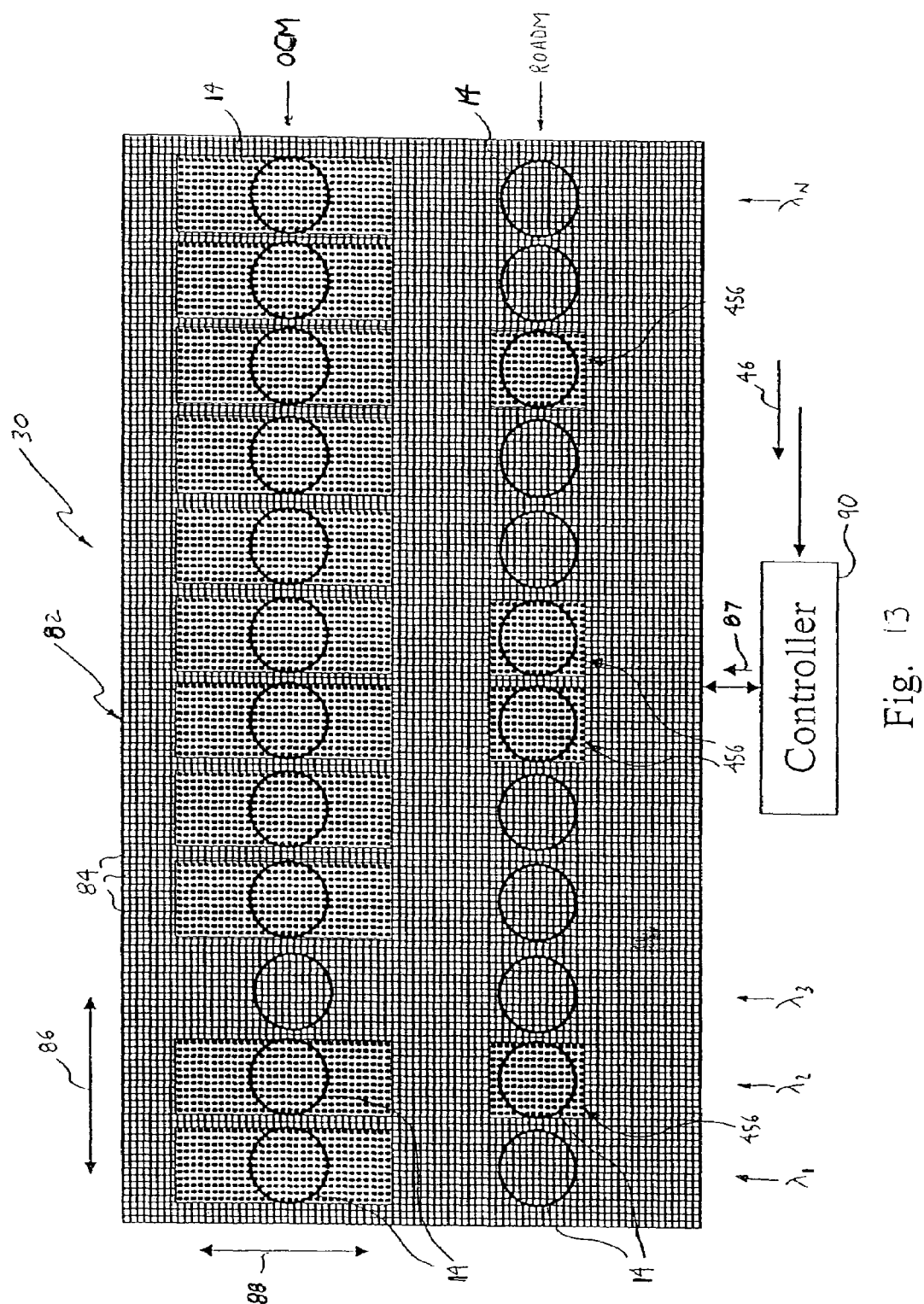
FIG. 13 is a block diagram of the spatial light modulator of FIG. 12, wherein the optical channels of the WDM input signals to the OCM and ROADM are distinctly projected onto the micro-mirror device, in accordance with the present invention.

The ends of pigtails 304, 404 are spaced in the spatial direction 88 so that the input signal 314, 418 of the OCM portion 402 and the ROADM portion 430, respectively, propagate along separate optical paths. Consequently, the diffracted light 316, 431 is spaced on the micromirror device 82 as illustrated in FIG. 13. As shown, the diffracted light 316 of the input light 314 of the OCM 312 is spread spectrally over the upper portion of the micromirror device 82, and the diffracted light 431 of the input light 12 of the ROADM 430 is spread spectrally over the lower portion of the micromirror device.

The OCM 402 substantially operates as described hereinbefore for the OCM 313 of FIGS. 10, 11. As shown in FIG. 13, a portion of the micromirrors 84 are tilted to the second position, as indicated by the black squares, to reflected the optical channels 14 at $\lambda_1$, $\lambda_2$, and $\lambda_4$–$\lambda_N$ away from the return path 31 as indicated by arrows 96. The other micromirrors associated with the optical channel 14 at $\lambda_3$ are tilted to the first position, as indicated by the white squares, to reflect the optical channel at $\lambda_3$ back along the return path 318 to pigtail 304. The returned optical channel at $\lambda_3$ passes through the circulator 316 to the photodetector 308, which provides an electrical signal 320 indicative of the returned optical channel 14 to the processing unit 310. The processing unit provides an output signal to an external device(s) 322 and a control signal 46 to controller 90 of the spatial light modulator 30 to control the flipping of the micromirrors 84 for reflecting any optical channel or groups/band(s) of channels 14 to the photodetector 308 for sensing.

Referring to FIG. 12, the ROADM 430 comprises a pair of optical portions 412, 414 wherein one portion receives the optical input signal 418 and the other portion 412 receives an optical add signal 432. The optics of the optical portion 414 is disposed in two tiers or horizontal planes similar to that described in FIGS. 1 and 2. Specifically, the optical portion 414 includes a three-port circulator 408, an optical fiber or pigtail 404, a collimator 22, a light dispersive element 24, a mirror 26, and a bulk lens 28 for directing light to and from a spatial light modulator 30.

The circulator 408 receives the WDM input signal (IN) 418 from an optical network (not shown) via optical fiber 434, and directs the input light to the pigtail 404. The input signal 418 exits the pigtail 404 (into free space) and passes through the collimator 22, which collimates the input signal. The collimated input signal 40 is incident on the light dispersion element 24 (e.g., a diffraction grating or a prism), which separates spatially the optical channels of the collimated input signal 40 by diffracting or dispersing the light from (or through) the diffraction grating 24.

The diffraction grating 24 directs the separated light 44 to the mirror 26. The mirror 26 reflects the separated light 44 to the Fourier lens 28 which focuses the separated light onto the spatial light modulator 30, as shown in FIG. 13. In response to a switching algorithm and input command 46, the spatial light modulator 30 reflects selected optical input channel(s) away from the Fourier lens (i.e., the dropped channels) to the other optical portion 412 and reflects the remaining optical input channel(s) (i.e., returned or express optical channels) back through the same optical path to the pigtail 404. The returned optical input channel(s) propagates through the optical circulator 408 to provide an express output signal 438 from optical fiber 440.

The dropped channel(s) passes through the other optical portion 412 of the ROADM 430. Specifically, the dropped channel(s) passes through the bulk lens 428 (e.g., a Fourier lens), and then reflects off the mirror 426 onto a light diffraction element 424 (e.g., a diffraction grating). The diffraction grating 424 further disperses the dropped channel(s). A collimator 422 focuses the dispersed light 62 onto the second pigtail 406, which is optically connected to the second 3-port circulator 410. The dropped channel(s) propagates from the second pigtail 406 to the output optical fiber 442 to provide an optical drop signal 444.

One or more optical channels 14 of an optical WDM add signal 432 may be added to the express/output signal 438 by providing to the optical fiber 446 the optical channels to be added. The added channel(s) 14 exits the pigtail 406 and passes through the collimator 422 to the diffraction grating 424, which separates spectrally the add channels of the collimated add signals 450 by dispersing or diffracting from (or through) the diffraction grating 424. The diffraction grating 424 directs the separated light 452 to the mirror 426 disposed in the second tier, similar to that described above in FIG. 2. The mirror 426 reflects the separated light 452 to the Fourier lens 28, which focuses the separated light 452 onto the spatial light modulator 30. The spatial light modulator 30 reflects selected add channel(s) of the separated light 452 to the Fourier lens 428 and reflects the remaining add channel(s) away from the spatial light modulator 30, as shown by arrows 454.

The selected add channel(s) 19 passes through the Fourier lens 28, which are then reflected off the mirror 26 onto the diffraction grating 24. The diffraction grating 24 further disperses the selected add channel(s) onto the collimator 22 which focuses the selected add channels to the pigtail 404. The selected add channel(s) propagates from the pigtail 404 to optical fiber 440, to thereby add the selected added channel(s) to the express/output signal 438. As will be described hereinafter, the selected add channels 19 and input channels 14 at the same wavelengths reflect off the same portion of spatial light modulator 30, and therefore when an add channel 19 is added to the express signal 438, the corresponding input channel 14 is dropped simultaneously.

In the operation of the ROADM 430, portions of the micromirrors 84 are tilted to the second position, as indicated by the black squares, to add and/or drop optical channels at $\lambda_2$, $\lambda_6$, $\lambda_7$ and $\lambda_{10}$. Specifically, the micromirrors at 456 reflect the optical channels 14 of the input light 418 at $\lambda_2$, $\lambda_6$, $\lambda_7$ and $\lambda_{10}$ away from the return path 433, as indicated by arrows 458, to the drop output 442. Further, the micromirrors at 456 reflect the optical channels 14 of the add signal 432 at $\lambda_2$, $\lambda_6$, $\lambda_7$ and $\lambda_{10}$ along the return path, as indicated by arrows 433, to the express output 440. When the micromirrors 84 are tilted to the first position, as indicated by the white squares, the optical channels 14 of the input signal 418 are returned to the express output 440, while the optical channels of the add signal 432 reflect along the optical path indicated by arrows 454.

Figure 14:
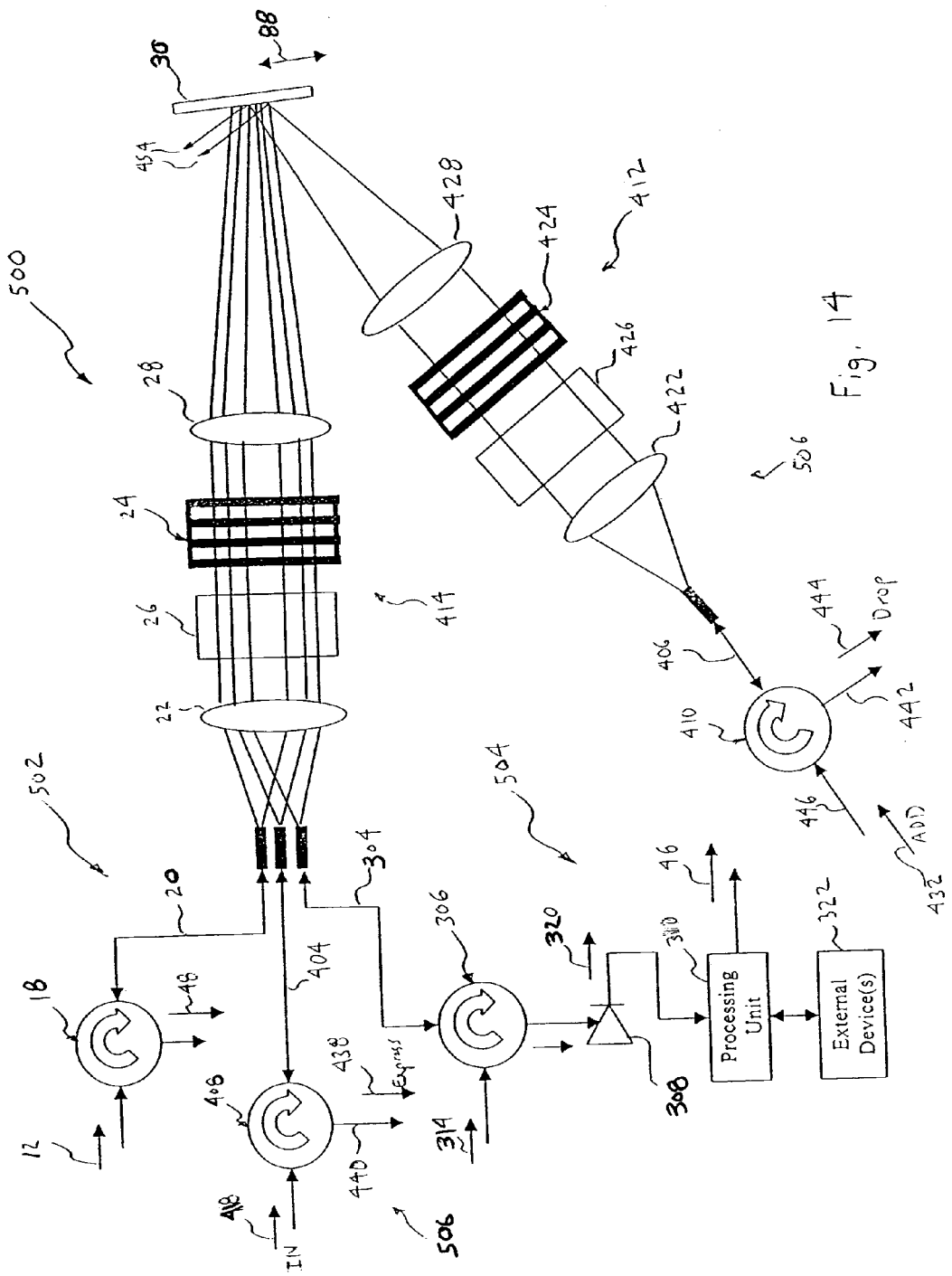
FIG. 14 is a plan view of a block diagram of another multifunction optical device having an OCM function; ROADM function and optical filter function.

In FIG. 14, an embodiment of a multi-functional optical device 500 in accordance with the present invention is shown. The optical device 500 combines the function of a reconfigurable optical filter 502, an optical channel monitor (OCM) 504 and a reconfigurable optical add/drop multiplexer (ROADM) 506 using one spatial modulator 30. The optical filter portion 502 is substantially the same as the optical filter portion 302 of FIG. 10 as described hereinbefore. The OCM portion 504 is substantially the same as the OCM portion 302 of FIG. 10 as described hereinbefore. The ROADM portion 506 is substantially the same as the ROADM portion 430 of FIG. 12 as described hereinbefore.

Figure 15:
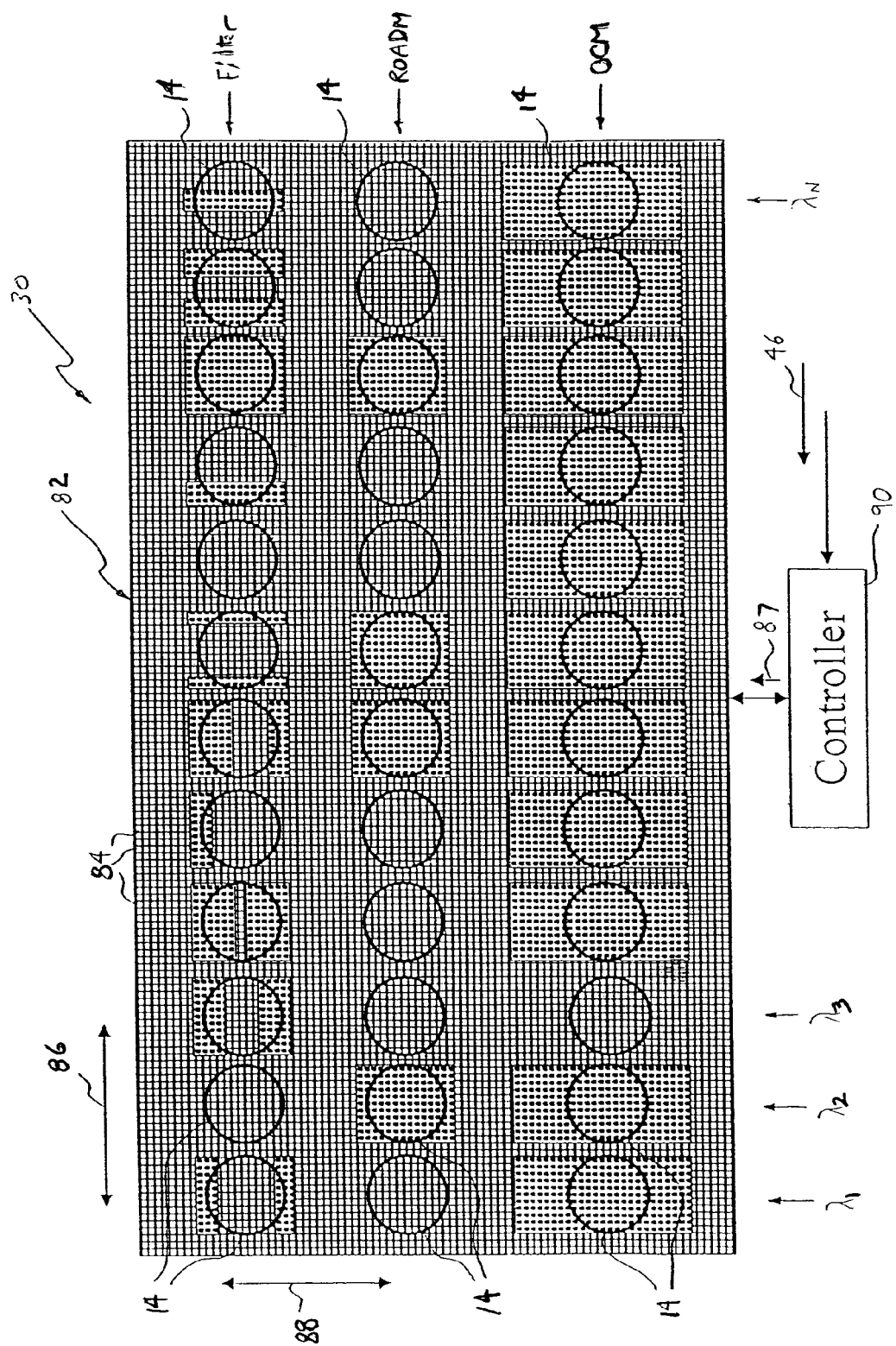
FIG. 15 is a block diagram of the spatial light modulator of FIG. 14, wherein the optical channels of the WDM input signals to the OCM, ROADM and optical filter are distinctly projected onto the micro-mirror device, in accordance with the present invention.

Not only does each device 502, 504, 506 use a common spatial light modulator 30 in this embodiment, the devices use a common set of free-space optics, namely the collimator 22, mirror 26, diffraction grating 24 and Fourier lens 28, similar to the device 400 of FIG. 12. The ends of the pigtails 20, 304, 404 of each device 502, 504, 506, respectively, are spaced in the spatial direction 88 so that the input light 12, 314, 418 of the devices 502, 504, 506 propagate along separate optical paths. Consequently, the diffracted light is spaced spatially on the micromirror device as illustrated in FIG. 15. As shown, the diffracted light of the input light 12 of the optical filter 502 is spectrally spread over the upper portion of the micromirror device 82, the diffracted light of the input light 418 and add light 432 of the ROADM 506 is spectrally spread over the intermediate portion of the micromirror device, and the diffracted light of the input light 314 of the OCM 504 is spectrally spread over the lower portion of the micromirror device. The operation of the devices 502, 504, 506 is the same as the optical filter 302 of FIGS. 10, the OCM 312 of FIG. 10 and the ROADM portion 430 of FIG. 12, as described hereinbefore.

Figure 16:
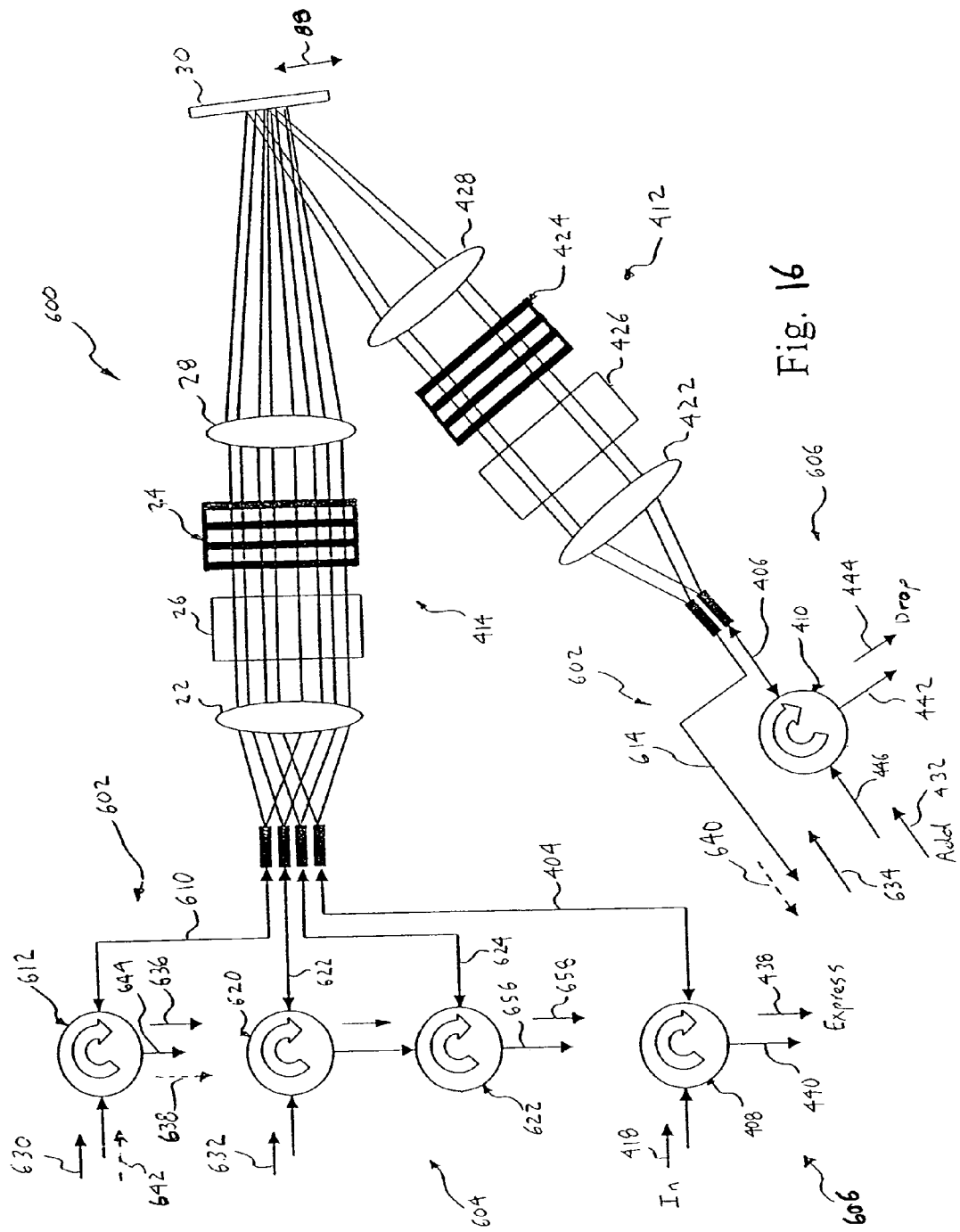
FIG. 16 is a plan view of a block diagram of another multifunction optical device having an interleaver function, blocking filter function and ROADM function.

In FIG. 16, an embodiment of a multi-functional optical device 600 in accordance with the present invention is shown. The device 600 combines the functions of an interleaver/deinterleaver device 602, a dual pass blocking filter 604 and a reconfigurable optical add/drop multiplexer (ROADM) 606 using one spatial modulator 30. Similar to the embodiments described hereinbefore, the devices 602, 604, 606 also use a common set of free-space optics 414, namely the collimator 22, mirror 26, diffraction grating 24 and Fourier lens 28, similar to the device 400 of FIG. 12. In addition, the interleaver/deinterleaver device 602 and the ROADM 606 also use a second set of common optics 412 that comprise the collimator 422, mirror 426, diffraction grating 424 and Fourier lens 428, similar to the device 400 of FIG. 12. The ROADM portion 606 is substantially the same as the ROADM portion 430 of FIG. 12, as described hereinbefore.

The functionality of the interleaver/deinterleaver device 602 is added to the ROADM device 606 by adding an input pigtail 610, a circulator 612, and an output pigtail 614. Not only does the interleaver/deinterleaver device 602 use a common spatial light modulator 30 in this embodiment, the interleaver/deinterleaver device uses common first and second set of free-space optics 412, 414, namely the collimators 22, 422, mirrors 26, 426, diffraction grating 24, 424 and Fourier lens 28, 428. The interleaver/deinterleaver portion 602 of the optical device 600 is substantially the same as the interleaver/deinterleaver described in co-pending U.S. Patent Application Ser. No. 60/325,064, which is incorporated herein by reference in its entirety.

The functionality of the dual pass blocking filter 604 is added to the ROADM device 606 by adding a pair of three-port circulators 620, 622 and a pair of input pigtails 624, 626. Not only does the blocking filter 604 use a common spatial light modulator 30 in this embodiment, the blocking filter uses common set of free-space optics 412, namely the collimators 22, mirrors 26, diffraction grating 24, and Fourier lens 28. The blocking filter 604 of the optical device 600 is substantially the same as the blocking filter described in co-pending U.S. Patent Application Ser. No. 60/344,585, which is incorporated herein by reference in its entirety.

Figure 17:
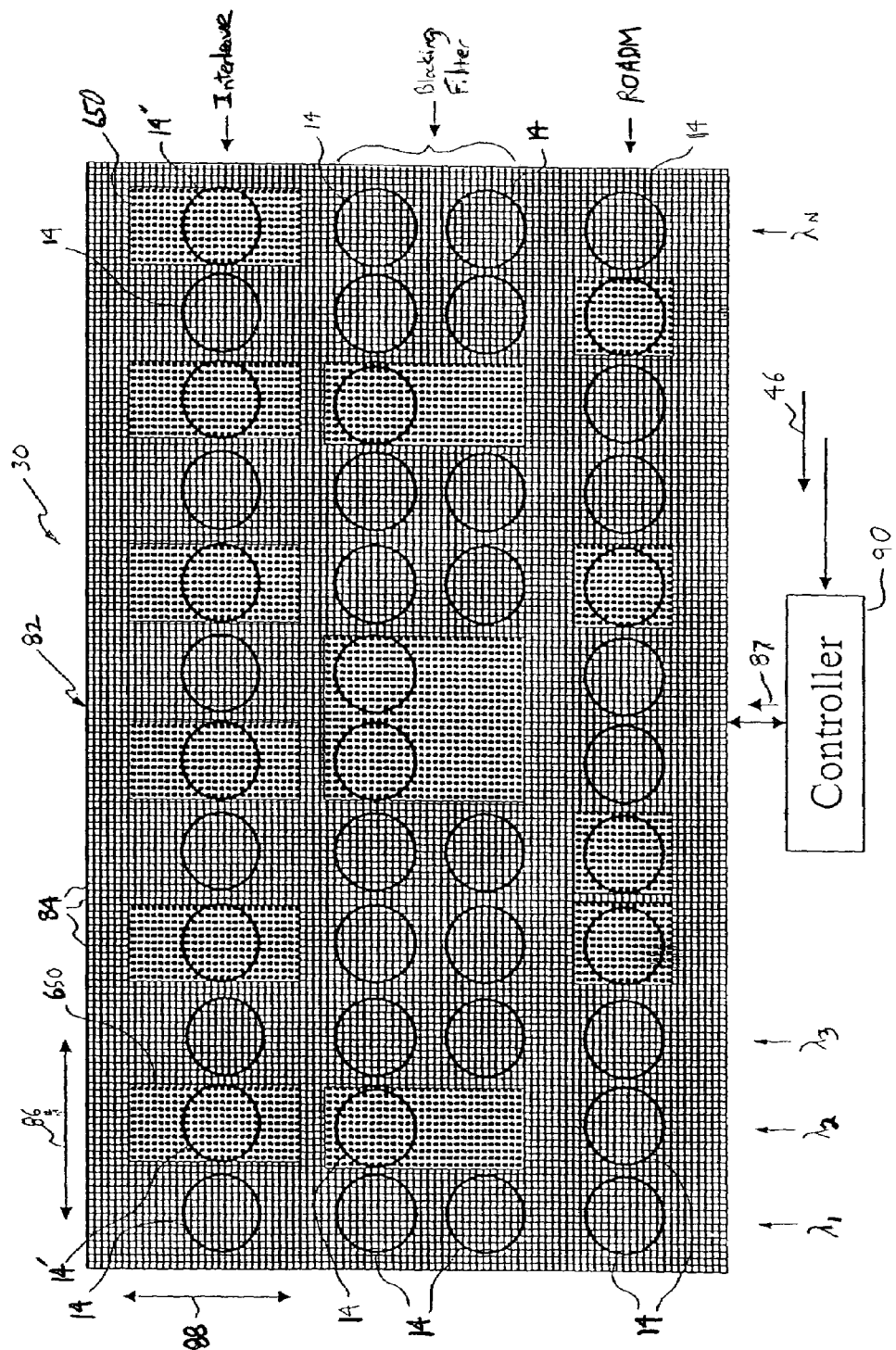
FIG. 17 is a block diagram of the spatial light modulator of FIG. 10, wherein the optical channels of the WDM input signals to the interleaver device, blocking filter and ROADM are distinctly projected onto the micro-mirror device, in accordance with the present invention.

The ends of the input pigtails 610, 622, 624, 404 of each device 602, 604, 606 are spaced in the spatial direction 88 so that the input light 630, 632, 418 of the devices 602, 604, 606 propagate along separate optical paths. Consequently, the diffracted light is spaced spatially on the micromirror device 82 as illustrated in FIG. 17. As shown, the diffracted light of the input light 630 of the interleaver device 602 is spectrally spread over the upper portion of the micromirror device 82, the diffracted light of the input light 632 of the blocking filter 604 is spectrally spread over the intermediate portion of the micromirror device, and the diffracted light of the input light 418 of the ROADM 606 is spectrally spread over the lower portion of the micromirror device. The operation of the ROADM 606 is the same as the ROADM portion 312 of FIG. 12, as described hereinbefore.

The interleaver/deinterleaver device 602 may function as an interleaver device or a deinterleaver device. As an interleaver, the device combines at least two optical WDM input signals 630, 634 into a single optical output signal 636. In one embodiment, as shown, one input signal 630 includes the odd input channels 14 (e.g., $\lambda_1$, $\lambda_3$, $\lambda_5$), and the other input signal 634 includes the even input channels (e.g., $\lambda_2$, $\lambda_4$, $\lambda_6$). The combined input signals 630, 634 provide a WDM output signal having each input channel 14, 14' (e.g., $\lambda_1$–$\lambda_6$). As a deinterleaver, the deinterleaver device separates an optical WDM input signal 642 into at least two optical output signals 638, 640. In one embodiment, as shown, the input signal 642 includes a WDM output signal having input channels at $\lambda_1$–$\lambda_6$. The input signal 642 is separated such that one output signal 638 includes the odd input-channels 14,14' (i.e., $\lambda_1$, $\lambda_3$, $\lambda_5$), and the other output signal 640 includes the even input channel (i.e., $\lambda_2$, $\lambda_4$, $\lambda_6$). In FIG. 16, the input signals 630, 634 and output signal 636 of the interleaver device are shown as solid arrows, while the input signal 642 and the output signals 638, 640 of the deinterleaver device are shown as dashed arrows. To simplify the description of the present invention, the interleaver/deinterleaver device is described as an interleaver, however, one should appreciate that the device may function as a deinterleaver by configuring one of the input ports to an output port, as illustrated by the dashed arrows 638, 640, 642.

Accordingly, the interleaver device 602 comprises a pair of optical portions 412, 414 that focuses and receives light to and from the spatial light modulator 30. A three-port circulator 612 provides input signals 630 to and receives an output signal 636 (at optical fiber 644) from the optical portion 414 via pigtail 610. The pigtail 614 receives the other input signal 634 from the second optical portion 412.

The first input signal 630 exits pigtail 610 (into free space) and passes through the first collimator 22, which collimates the first input signal. The collimated input signal is incident on the light dispersion element 24 (e.g., a diffraction grating or a prism), which separates spatially the optical channels of the collimated input signal by diffracting or dispersing the light from (or through) the first light dispersion element. The diffraction grating 24 directs the separated light to the mirror 26. The first mirror 26 reflects the separated light to the first bulk lens 28 (e.g., a Fourier lens), which focuses the separated light onto the spatial light modulator 30, as shown in FIG. 17.

In response to a switching algorithm and input command 46, the spatial light modulator 30 reflects the optical input channel(s) 14 of first input signal back through the same optical path to the pigtail 610. The returned optical input channel(s) propagates to the optical circulator 612 to provide an output signal 636 from optical fiber 642.

The optical channels 14' of the second input signal 634 are combined with or added to the output signal 636. The channel 14' of the second input signal 634 exit the second pigtail 614 and passes through the collimator 422 to the diffraction grating 424, which separates spectrally the channels 14' of the collimated second input signal 634 by dispersing or diffracting from (or through) the diffraction grating 424. The diffraction grating 424 directs the separated light to the mirror 426 for the optical portion 412. The mirror 426 reflects the separated light to the bulk lens 428, which focuses the separated light onto the spatial light modulator 30. As shown in FIG. 17, the separated light of the first input signal 630 and the separate light of the second input signal 634 occupy different, alternating portion (or sections) of the spatial light modulator 30. The spatial light modulator 30 reflects the channel 14' of the separated light to the bulk lens 28.

The channel 14' of the second input signal 634 passes through the bulk lens 28, which are then reflected off the mirror 26 onto the diffraction grating 24. The diffraction grating 24 further disperses the channel 14' onto the collimator 22 which focuses the channels 14' to the pigtail 610. The channels 14' propagate from the pigtail 610 to optical fiber 642, to thereby combine the channels 14' to the output signal 636.

FIG. 17 further illustrates the outline of the optical channels 14, 14' of the first and second input signals 630, 634, respectively, which are dispersed off respective diffraction gratings 24, 424 and focused by bulk lens 28, 428 respectively, onto the array of micro-mirrors 84 of the micro-mirror device 82. Each channel 14, 14' is distinctly separated from other channels across the spectrum and have a generally circular cross-section, such that the optical channels do not substantially overlap spatially when focused onto the spatial light modulator 30. The optical channels have a circular cross-section to project as much of the beam as possible over a multitude of micro-mirrors 84, while keeping the optical channels separated by a predetermined spacing. One will appreciate though that the diffraction gratings 24, 424 and bulk lens 28, 428 may be designed to reflect and focus any optical channel or group of optical channels with any desired cross-sectional geometry, such as elliptical, rectangular, square, polygonal, etc. Regardless of the cross-sectional geometry selected, the cross-sectional area of the channels 14 should illuminate a plurality of micro-mirrors 84, which effectively pixelates the optical channels.

FIG. 17 further illustrates the position of the micro-mirrors 84 of the micro-mirror device 82 for combining the optical channels 14, 14' of the input signals 630, 634. The outline of each channel 14, 14' is shown to provide a reference to visually locate the groups of tilted mirrors 650. As shown, the groups of mirrors 650 associated with each respective optical channel 14' at $\lambda_2, \lambda_4, \lambda_6, \lambda_8, \lambda_{10}, \lambda_{12}$ of the second input signal 634 are tilted away from the return path to the second position, as indicated by the blackening of the micro-mirrors 84. Each group of tilted mirrors 650 provides a generally rectangular shape, but one will appreciate that any pattern or shape may be tilted to redirect an optical channel. In an exemplary embodiment, each group of micro-mirrors 650 reflects substantially all the light of each respective optical channel 14' and reflects substantially no light of any adjacent channels. The remaining micro-mirrors 84 reflects substantially all the light of each channel 14 at $\lambda_1, \lambda_3, \lambda_5, \lambda_7, \lambda_9$ are flat (i.e., first position), as indicated by the white micro-mirrors, to reflect the light back along the return path to the first pigtail 610, as described hereinbefore.

Referring to FIGS. 16 and 17 in the operation of the blocking filter 604, the input signal 632 is first dispersed by the diffraction grating 24 onto the micro-mirror device 82 of the spatial light modulator 30. Each input channel 14 is spread along the spectral axis 86 as shown in FIG. 17. The groups 452, 453, 454 of shaded micro-mirrors 84 delete the optical input channels at $\lambda_2, \lambda_6, \lambda_7$ and $\lambda_{10}$ of the input signal 632, and reflect the through input channels at $\lambda_1, \lambda_3-\lambda_5, \lambda_8, \lambda_9$ and $\lambda_{11}-\lambda_N$ back to the first pigtail 622. The through input channels at $\lambda_1, \lambda_3-\lambda_5, \lambda_8, \lambda_9$ and $\lambda_{11}-\lambda_N$ then propagate to second pigtail 624 through the circulators 620, 622 respectively. The end of the second pigtail 624 is displaced spatially such that the through input channels 14' at $\lambda_1, \lambda_3-\lambda_5, \lambda_8, \lambda_9$ and $\lambda_{11}-\lambda_N$ are dispersed onto the micro-mirror device 82 and spaced in the spatial axis 88 a predetermined distance from the input channels 14 at $\lambda_1-\lambda_N$, as shown in FIG. 17. The micro-mirrors 84 are titled to reflect the selected input channel 14' back to second pigtail 624, while the micro-mirrors adjacent the input channels at $\lambda_2, \lambda_6, \lambda_7$ and $\lambda_{10}$ are tilted to delete any remaining light. The through input channels 14' then propagate through the second circulator 622 to the output fiber 656 to provide output signal 658.

Figure 18:
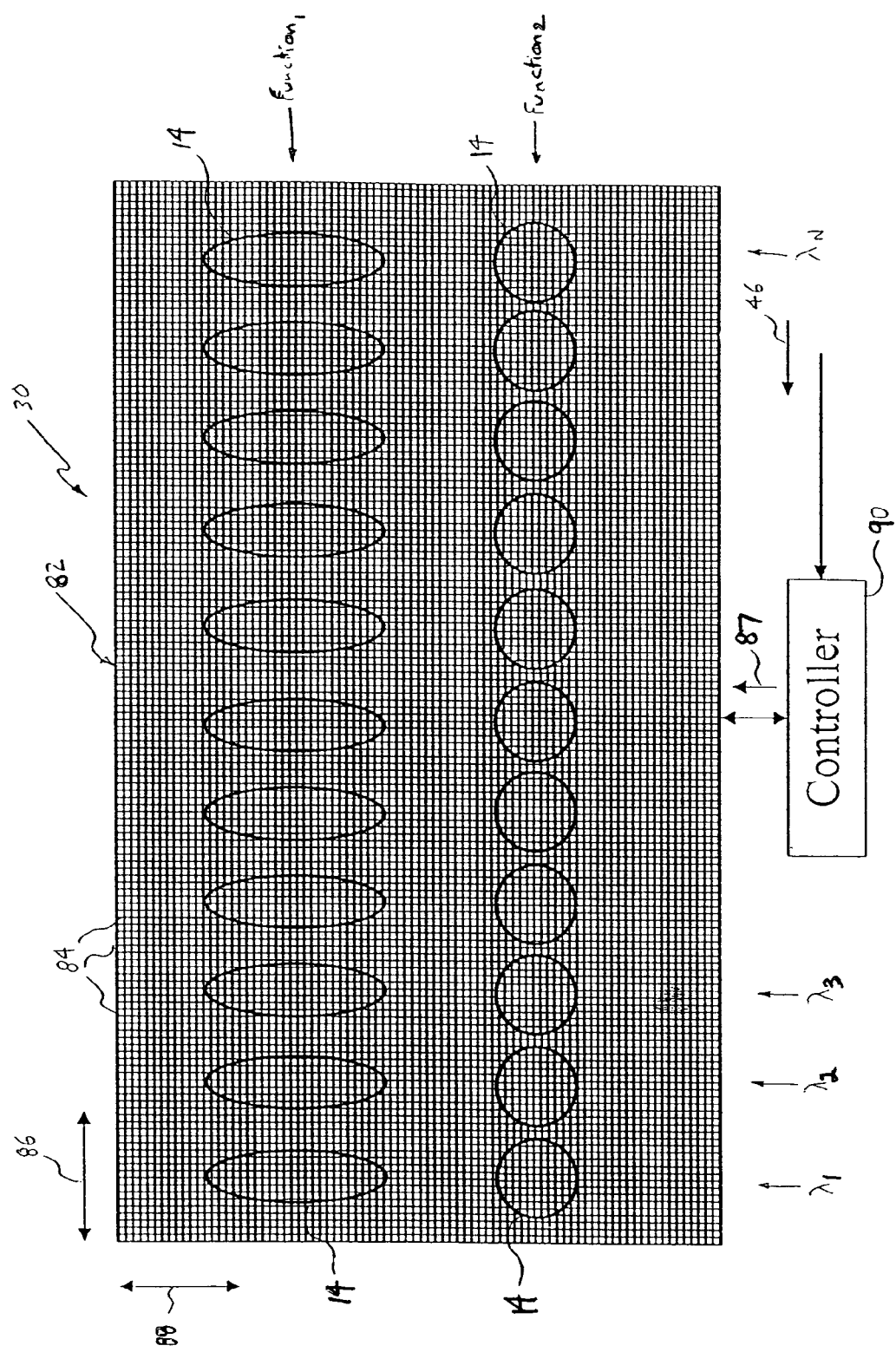
FIG. 18 is a block diagram of a spatial-light modulator of another embodiment of a multifunctional optical device, wherein the optical channels of a WDM input signal are distinctly projected onto the micro-mirror device, in accordance with the present invention.
Figure 19:
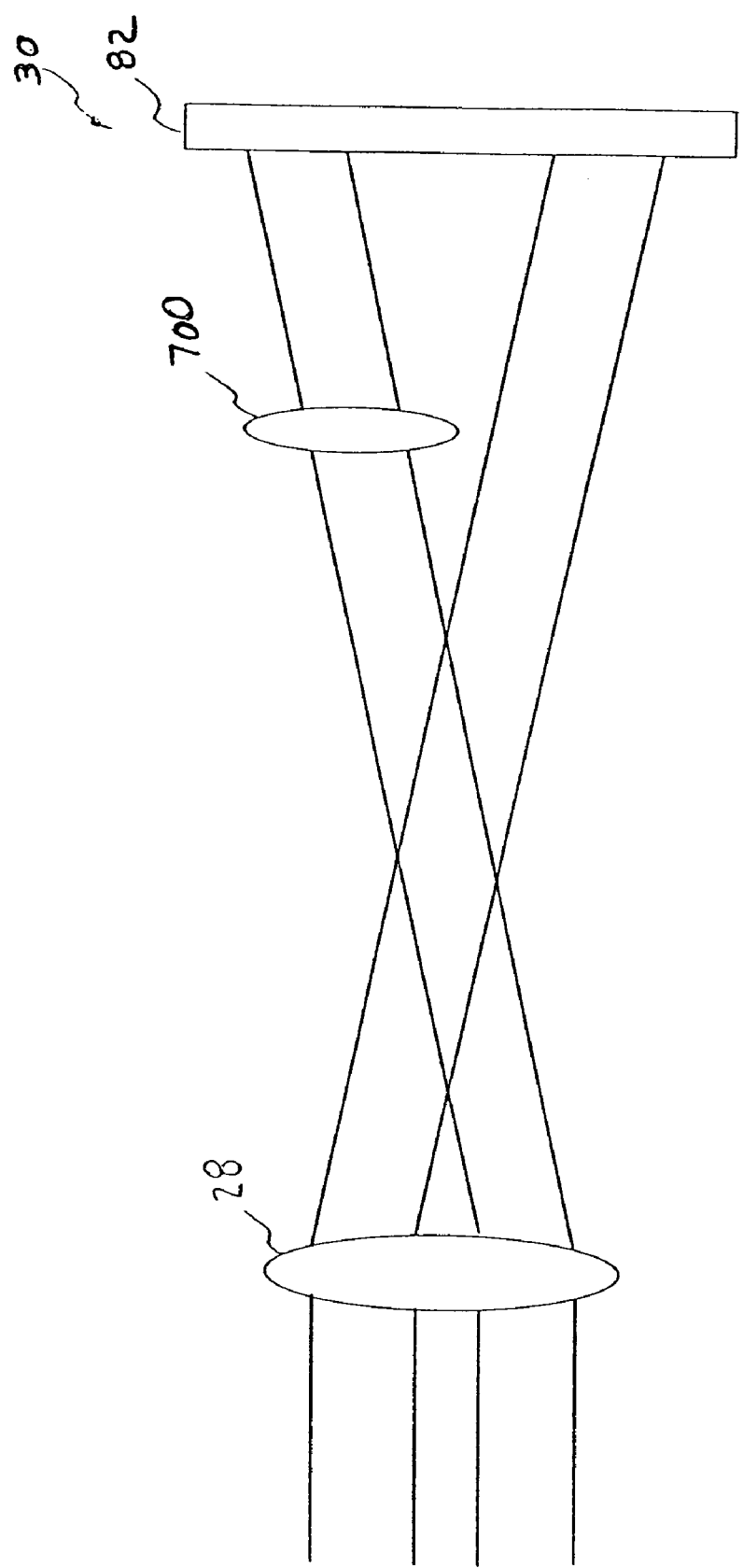
FIG. 19 is an enlarged view of a portion of another embodiment of a multifunctional optical device, in accordance with the present invention.

While the embodiments of the present invention described hereinbefore provide optical channels having a circular cross-section imaged on the micromirror device 82 of the spatial light modulator 30, the present invention contemplates imaging optical channels onto the micromirror device having different cross-sectional geometry as shown in FIG. 18. As shown, the cross-sectional geometry of one optical function is elliptical while the cross-sectional geometry of the second optical function is circular. To accomplish the different cross-sections using the same optical components (e.g., collimator 28), an additional lens 700 (e.g., a cylindrical lens) is provided in the optical path of one of the collimated light beams as shown in FIG. 19.

Figure 21A:
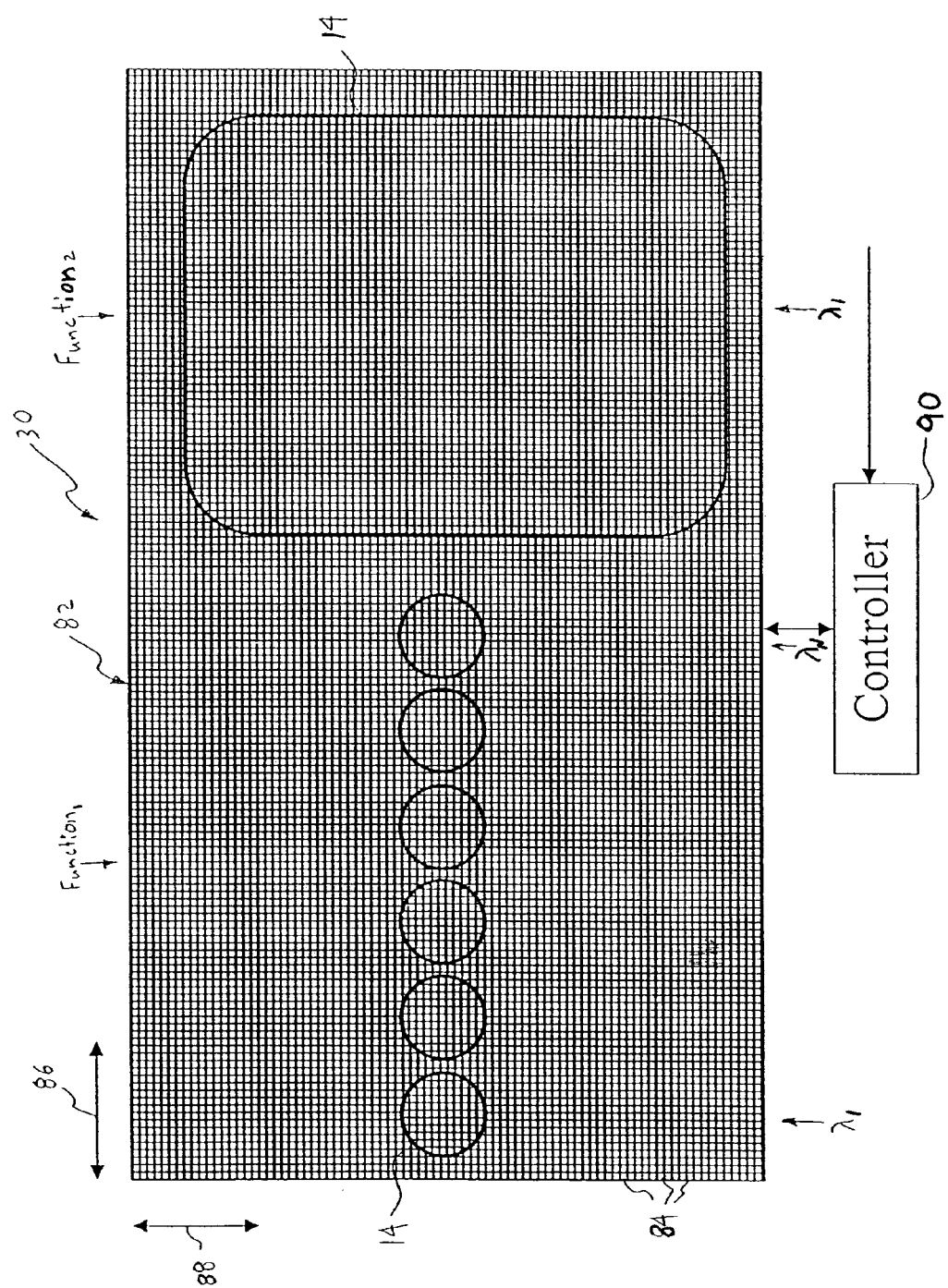
FIG. 21a is a block diagram of a spatial light modulator of another embodiment of a multifunctional optical device, wherein the optical channels of a WDM input signal are distinctly projected onto the micro-mirror device, in accordance with the present invention.

In the embodiments of the present invention described hereinbefore, the launch pigtails of the optical function are spaced in the spatial direction 88 that results in the channels of the corresponding input signals being similarly space in the spatial direction. The present invention, however, contemplates spacing the launch pigtail in the spectral direction 86, such that the respective input channels 14 of each function are spaced sequentially in the spectral direction as shown in FIGS. 20 and 21a. FIG. 20 is also illustrative of the optical channels of each input signal having a different cross-sectional geometry, and the channels of the respective input channels have different spacing.

Figure 21B:
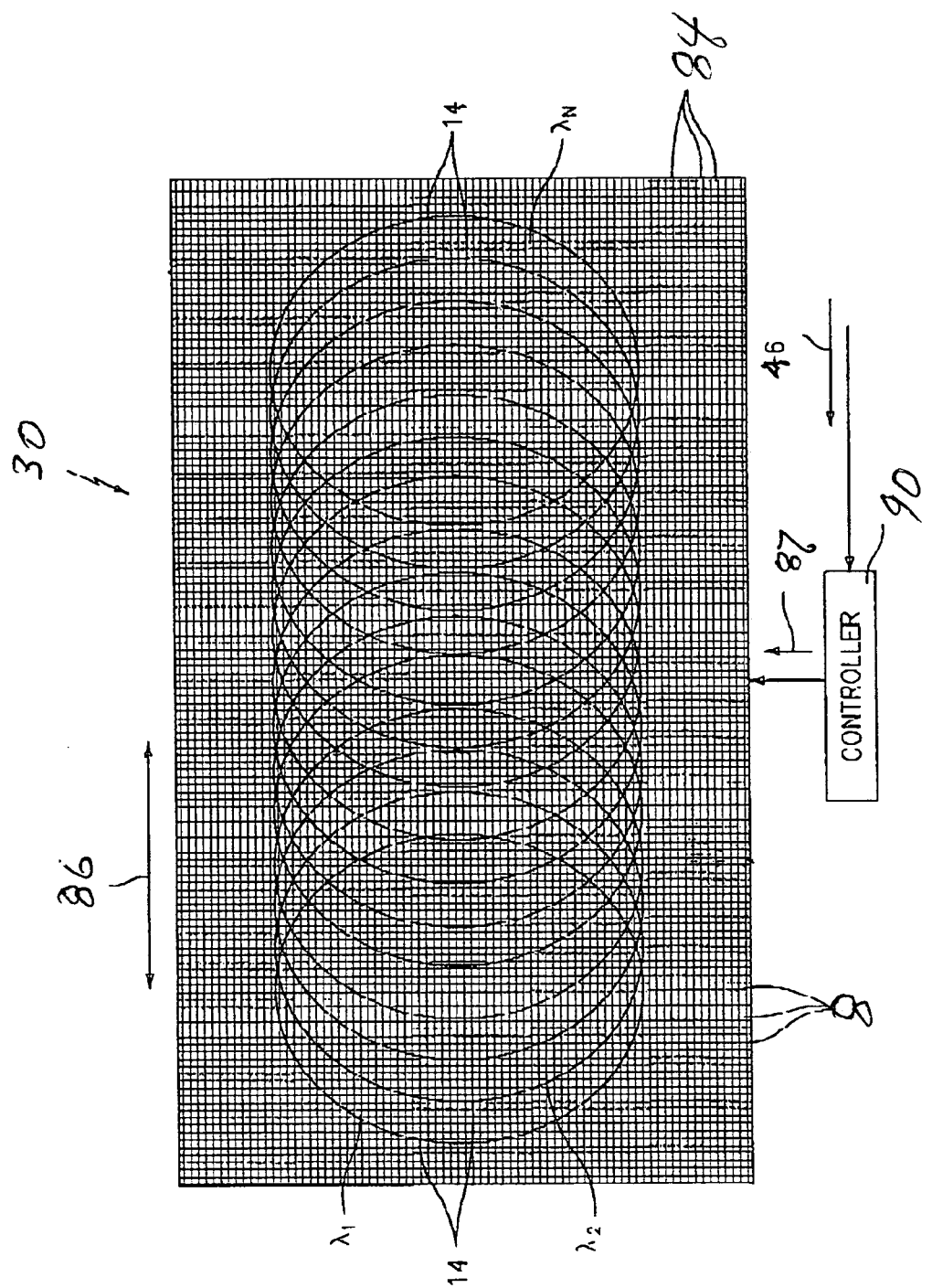
FIG. 21b is a block diagram of a spatial light modulator of another embodiment of an optical filter having a micromirror device, wherein the optical channels of a WDM input light are overlappingly dispersed onto the micro-mirror device in various degrees of overlap, in accordance with the present invention.

FIG. 21a illustrates an optical channel of the second function that is spread over a large number of micromirrors 84 similar to that used to provide an optical chromatic dispersion compensation device as described in U.S. Patent Application Ser. No. 60/332,318 which is incorporated herein by reference. FIG. 21b shows an embodiment wherein the optics (i.e., collimating lens 26, bulk lens 34 and diffraction grating 24) spread or disperse the input light onto the micromirror device such that the optical channels substantially overlap. The tilt of a micromirror will filter or attenuate the light of two or more adjacent channels. See patent application Ser. No. 10/115,647 for an example of this technology applied to a digital signal equalizers.

Figure 22:
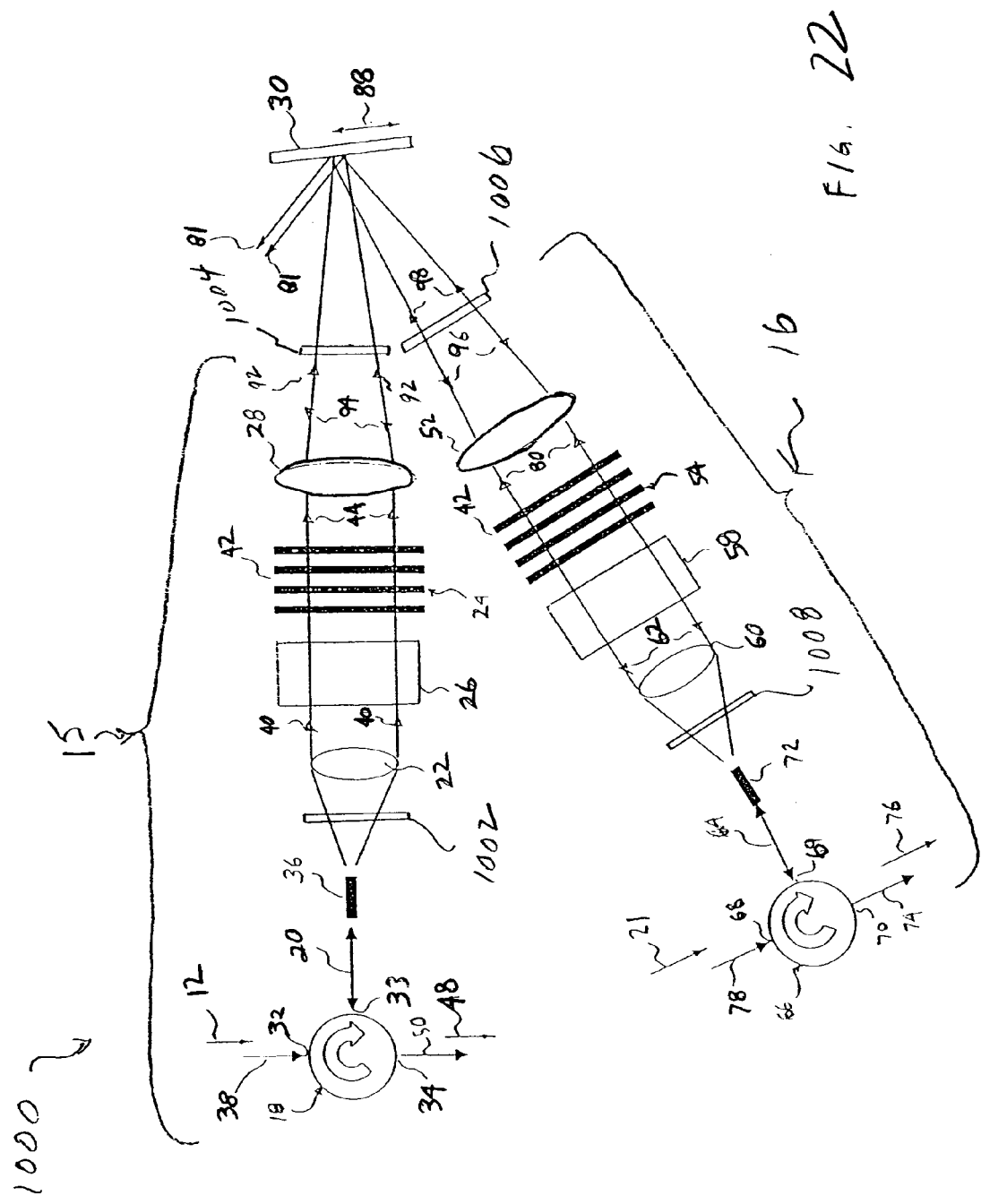
FIG. 22 shows an alternative embodiment of a reconfigurable multifunctional optical device having one or more optic devices for minimizing polarization dispersion loss (PDL)

FIG. 22 shows an embodiment of a reconfigurable multifunctional optical device generally indicated as 1000 having optical portions 15, 16 with one or more optical PDL devices 1002, 1004, 1006, 1008 for minimizing polarization dependence loss (PDL). The one or more optical PDL devices 1002, 1008 are arranged between the capillary tube 36 and the grating 24, while the one or more optical PDL devices 1004, 1006 are arranged between the grating 24 and the spatial light modulator 30.

The optical PDL device 1002 may include a polarization splitter for splitting each channel into its pair of polarized light beams and a rotator for rotating one of the polarized light beams of each optical channel. The optical PDL device 1008 may include a rotator for rotating one of the previously rotated and polarized light beams of each optical channel and a polarization splitter for combining the pair of polarized light beams of each channel.

The one or more optical devices 1002, 1004, 1006, 1008 may be incorporated in any of the embodiments shown and described above, including but not limited to the embodiments shown and described above.

In effect, as a person skilled in the art will appreciate, a diffraction grating such as the optical elements 42, 54 has a predetermined polarization dependence loss (PDL) associated therewith. The PDL of the diffraction grating 24 is dependent on the geometry of the etched grooves 42 of the grating. Consequently, means to mitigate PDL may be desired. The λ/4 plate between the spatial light modulator 30 and the diffraction grating(s) 24, 54 (before or after the bulk lens 28, 52) mitigates the PDL for any of the embodiments described hereinbefore. The fast axis of the λ/4 plate is aligned to be approximately 45 degrees to the direction or axis of the lines 42 of the diffraction grating 24. The mirror is angled to reflect the separated channels back through the λ/4 plate to the diffraction grating. In the first pass through the λ/4 plate, the λ/4 plate circularly polarizes the separated light. When the light passes through the λ/4 plate again, the light is linearly polarized to effectively rotate the polarization of the separated channels by 90 degrees. Effectively, the λ/4 plate averages the polarization of the light to reduce or eliminate the PDL. One will appreciate that the λ/4 plate may not be necessary if the diffraction grating has low polarization dependencies, or other PDL compensating techniques are used that are known now or developed in the future.

As shown and described herein, the polarized light beams may have a generally circular cross-section and are imaged at separate and distinct locations on the spatial light modulator 30, such that the polarized light beams of the optical channels do not substantially overlap spatially when focused onto the spatial light modulator, as shown, for example, in FIGS. 6, 18, 25, 34 and 35.

Figure 23:
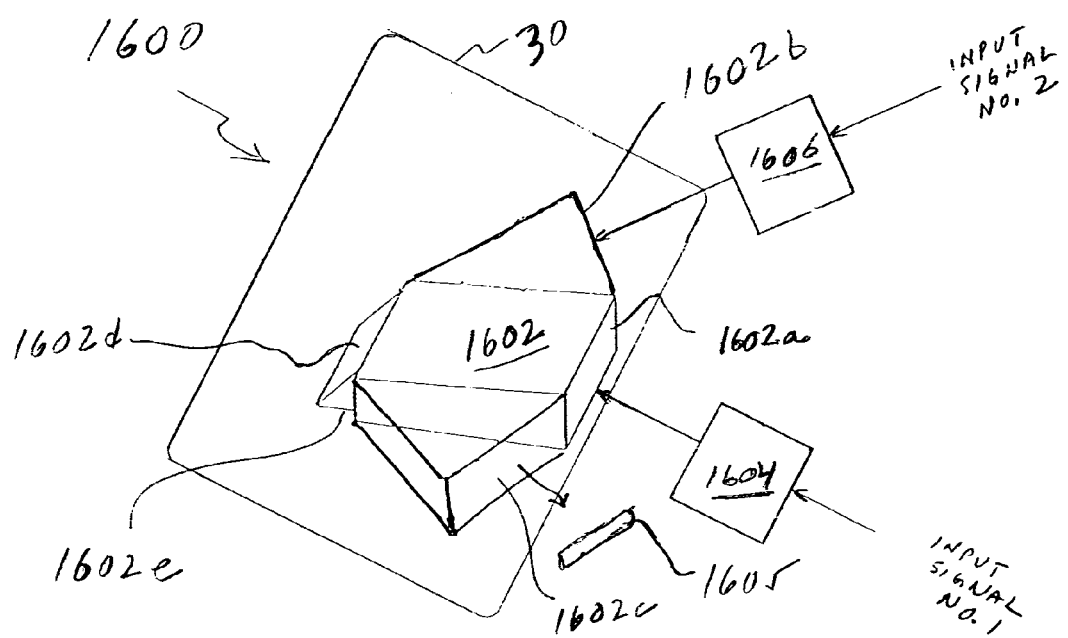
FIG. 23 shows an embodiment of a reconfigurable multifunctional optical device having a chisel prism in accordance with the present invention.

FIG. 23 shows a reconfigurable multifunctional optical device generally indicated as 1600 similar to that shown above, except that the micromirror device is oriented such that the tilt axis 85 is perpendicular to the spectral axis 86. The reconfigurable multifunctional optical device 1600 has a chisel prism 1602 arranged in relation to the spatial light modulator 30, a set of optical components 1604, a retromirror 1605 and a complimentary set of optical components 1606. The underlying configuration of the reconfigurable multifunctional optical device 1600 may be implemented in any of the embodiments show and described in relation to that shown and described above in which the pivot or tilt axis of the mirrors of the DVD device is perpendicular to the spectral axis of the channels projected on the DVD device.

The set of optical components 1604 and the complimentary set of optical components 1606 are similar to the optical portions 15, 16 shown and described herein. For example, see FIG. 1A. The spatial light modulator 30 is shown and described herein as the well known DMD device. The chisel prism 1602 has multiple faces, including a front face 1602*a*, first and second beveled front faces 1602*b*, 1602*c*, a rear face 1602*d* and a bottom face generally indicated by 1602*e*. (It is noted that in embodiments having no retroflector or third optical path only two front faces are used, and in embodiments having a retroflector all three front faces are used.) Light from the set of optical components 1604 and the complimentary set of optical components 1606 passes through the chisel prism 1602, reflects off the spatial light modulator, and passes back through the chisel prism 1602.

The chisel prism design described herein addresses a problem in the optical art when using micromirror devices. The problem is the ability to send a collimated beam out to a reflective object and return it in manner that is insensitive to the exact angular placement of the reflective object. Because a light beam is typically collimated and spread out over a relatively large number of micromirrors, any overall tilt of the array causes the returned beam to "miss" the optical component, such as a pigtail, intended to receive the same.

The present invention provides a way to reduce the tilt sensitivity by using a classical optical design that certain combinations of reflective surfaces stabilize the reflected beam angle with respect to angular placement of the reflector. Examples of the classical optical design include a corner-cube (which stabilize both pitch and yaw angular errors) or a dihedral prism (which stabilize only one angular axis.).

One advantage of the configuration of the present invention is that it removes the tilt sensitivity of the optical system (which may comprise many elements besides a simple collimating lens such as element 26 shown and described above) leading up to the retro-reflective spatial light modulator 30. This configuration allows large beam sizes on the spatial light modulator without the severe angular alignment sensitivities that would normally be seen.

Patent application Ser. No. 10/115,647, which is hereby incorporated by reference, shows and describes the basic principal of these highly stable reflective elements in which all the surfaces of the objects being stable relative to one another, while the overall assembly of the surfaces may be tilted without causing a deviation in reflected angle of the beam that is large compared to the divergence angle of the input beam.

Figure 24:
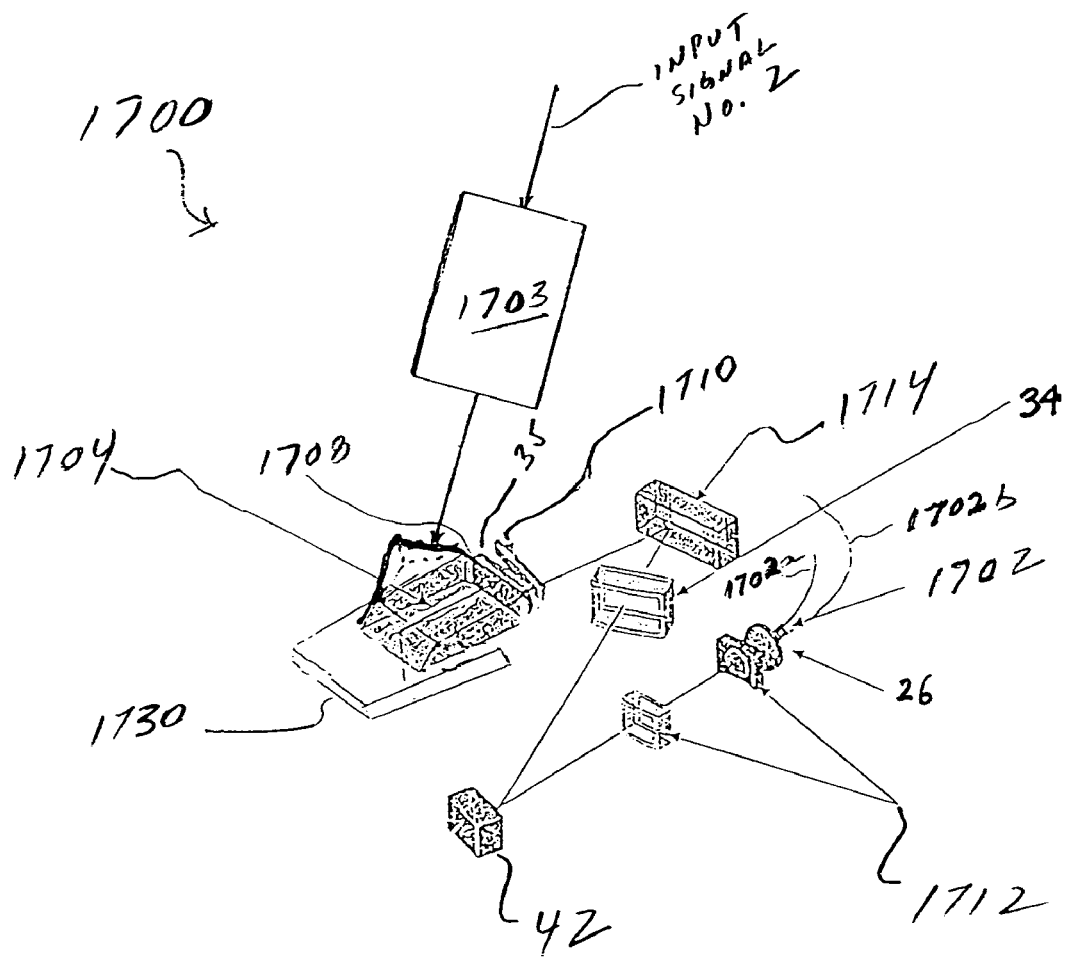
FIG. 24 shows an alternative embodiment of a reconfigurable multifunctional optical device having a chisel prism in accordance with the present invention.

FIG. 24 illustrates a schematic diagram of reconfigurable multifunctional optical device generally indicated as 1700 that provides improved sensitivity to tilt, alignment, shock, temperature variations and packaging profile, which incorporates such a tilt insensitive reflective assembly. The scope of the invention is intended to include using the chisum prism technology described herein in any one or more of the embodiments described herein.

Similar to the embodiments described hereinbefore, and by way of example, the reconfigurable multifunctional optical device 1700 includes a first set of optical components having a dual fiber pigtail 1702 (circulator free operation), the collimating lens 26, a bulk diffraction grating 42, a Fourier lens 34, a 1/4λ plate 35, a reflector 26 and a spatial light modulator 1730 (similar to that shown above). The dual fiber pigtail 1702 includes a transmit fiber 1702a and a receive fiber 1702b. The first set of optical components typically provide a first optical input signal having one or more optical bands or channels on the receive fiber 1702b, as well as providing an optical output signal on the transmit fiber 1702b.

Similar to the embodiments described hereinbefore, the reconfigurable multifunctional optical device 1700 also includes a complimentary set of optical components 1703 for providing a second optical input signal, which is typically an optical signal to be added to the first optical input signal.

The reconfigurable multifunctional optical device 1700 also includes a chisel prism 1704 having multiple internally reflective surfaces, including a top surface, a back surface, as well as transmissive surfaces including two front surfaces and a bottom surface, similar to that shown in FIG. 23. The micro-mirror device 1730 is placed normal to the bottom surface, as shown. In operation, the chisel prism 1704 reflects the first optical input signal from the first set of optical components and the second optical input signal from the complimentary set of optical components 1703 both to the spatial light modulator 1730, and reflects the optical output signal back to the first set of optical components.

The chisel prism 1704 decreases the sensitivity of the optical filter to angular tilts of the optics. The insensitivity to tilt provides a more rugged and robust device to shock vibration and temperature changes. Further, the chisel prism 1704 provides greater tolerance in the alignment and assembly of the optical filter 1700, as well as reduces the packaging profile of the filter. To compensate for phase delay associated with each of the total internal reflection of the reflective surfaces of the prism (which will be described in greater detail hereinafter), a λ/9 wave plate 1708 is optically disposed between the prism 1704 and the λ/4 wave plate 35. An optical wedge or lens 1710 is optically disposed between the λ/4 wave plate 35 and the diffraction grating 30 for directing the output beam from the micro-mirror device 1730 to the receive pigtail 1702a of the dual fiber pigtail 1702b. The optical wedge or lens 1710 compensates for pigtail and prism tolerances. The scope of the invention is intended to cover embodiments in which the optical wedge 1710 is arranged parallel or oblique to the front surface of the wedge 1704. Moreover, as shown, these components are only arranged in relation to one front surface; however, as a person skilled in the art would appreciate, these optical components would typically be arranged in relation to any one or more front surfaces shown in FIG. 24, as well as the front surfaces in the other chisel prism embodiments shown ad described herein.

The optical device 1700 further includes a telescope 1712 having a pair of cylindrical lens that are spaced a desired focal length. The telescope 1712 functions as a spatial beam expander that expands the input beam (approximately two times) in the spectral plane to spread the collimated beam onto a greater number of lines of the diffraction grating. The telescope 1712 may be calibrated to provide the desired degree of beam expansion. The telescope advantageously provides the proper optical resolution, permits the package thickness to be relatively small, and adds design flexibility.

A folding mirror 1714 is disposed optically between the Fourier lens 34 and the λ/4 wave plate 35 to reduce the packaging size of the optical filter 1700.

Figure 25:
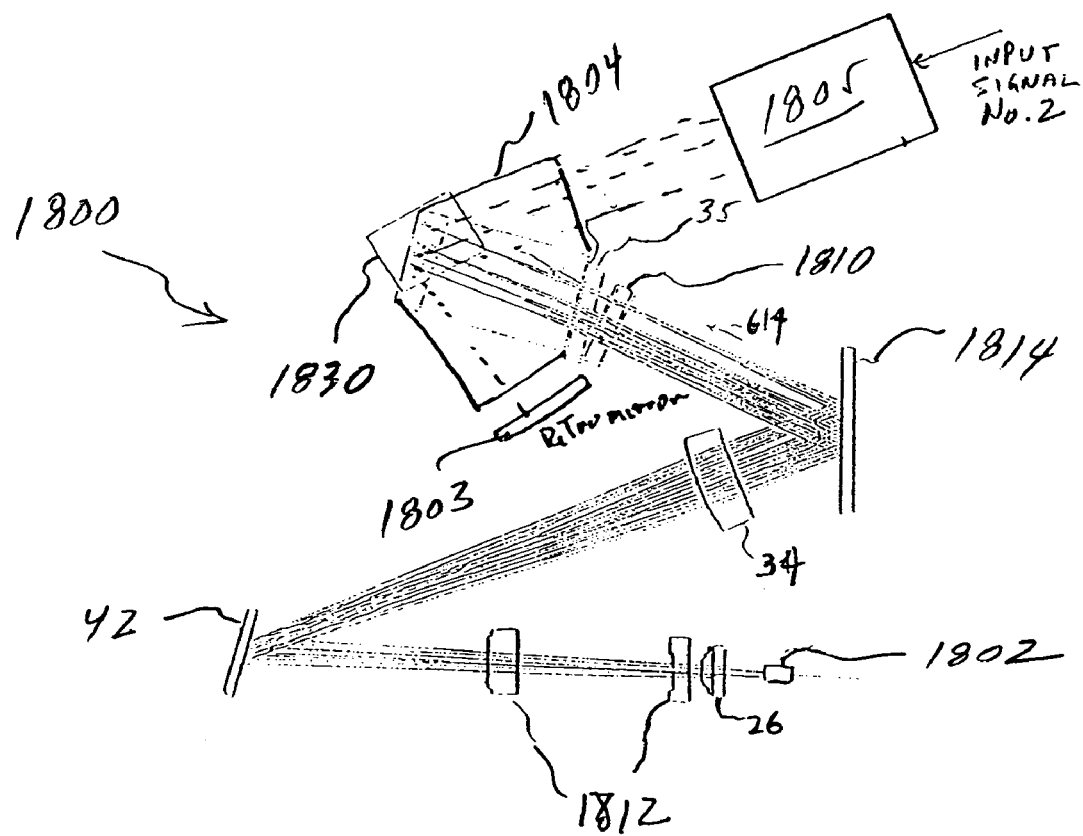
FIG. 25 shows an alternative embodiment of a reconfigurable multifunctional optical device having a chisel prism in accordance with the present invention.

FIG. 25 shows a practical embodiment of a tilt-insensitive reflective assembly 1800 comprising a specially shaped prism 1804 (referred as the "chisel prism") arranged in relation to the micro-mirror device 1830, a set of optical components as shown, a compliment set of optical components generally indicated as 1805, as well as a retroreflector 1803 consistent with that discussed above.

Unlike an ordinary 45 degree total internal reflection (TIR) prism, in this embodiment the back surface 1821 of the prism 1804 is cut at approximately a 48 degree angle indicated as 1804a relative to the bottom surface 1820 of the prism 1804. The top surface 1822 of the prism 1804 is cut at a 4 degree angle indicated as 1804b relative to the bottom surface 1820 to cause the light to reflect off the top surface 1822 via total internal reflection. The front surface 1823 of the prism 1804 is cut at a 90 degree angle relative to the bottom surface 1820. The prism 1804 therefore provides a total of 4 surface reflections in the optical assembly (two TIRs off the back surface 1821, one TIR off the micromirror device 1830, and one TIR off the top surface 1822.)

In order to remove the manufacturing tolerances of the prism angles, a second smaller compensating prism or wedge 1810 (or wedge), having a front surface cut at a shallow angle (e.g., as 10 degrees) with respect to a back surface, may also be used. Slight tilting or pivoting about a pivot point of the compensation wedge 1810 causes the light beam to be pointed in the correct direction for focusing on the receive pigtail 1802.

The combination of the chisel prism 1804 and the compensation wedge 1810 allows for practical fabrication of optical devices that spread a beam out over a significant area and therefore onto a plurality of micromirrors, while keeping the optical system robust to tilt errors introduced by vibration or thermal variations.

Figure 26:
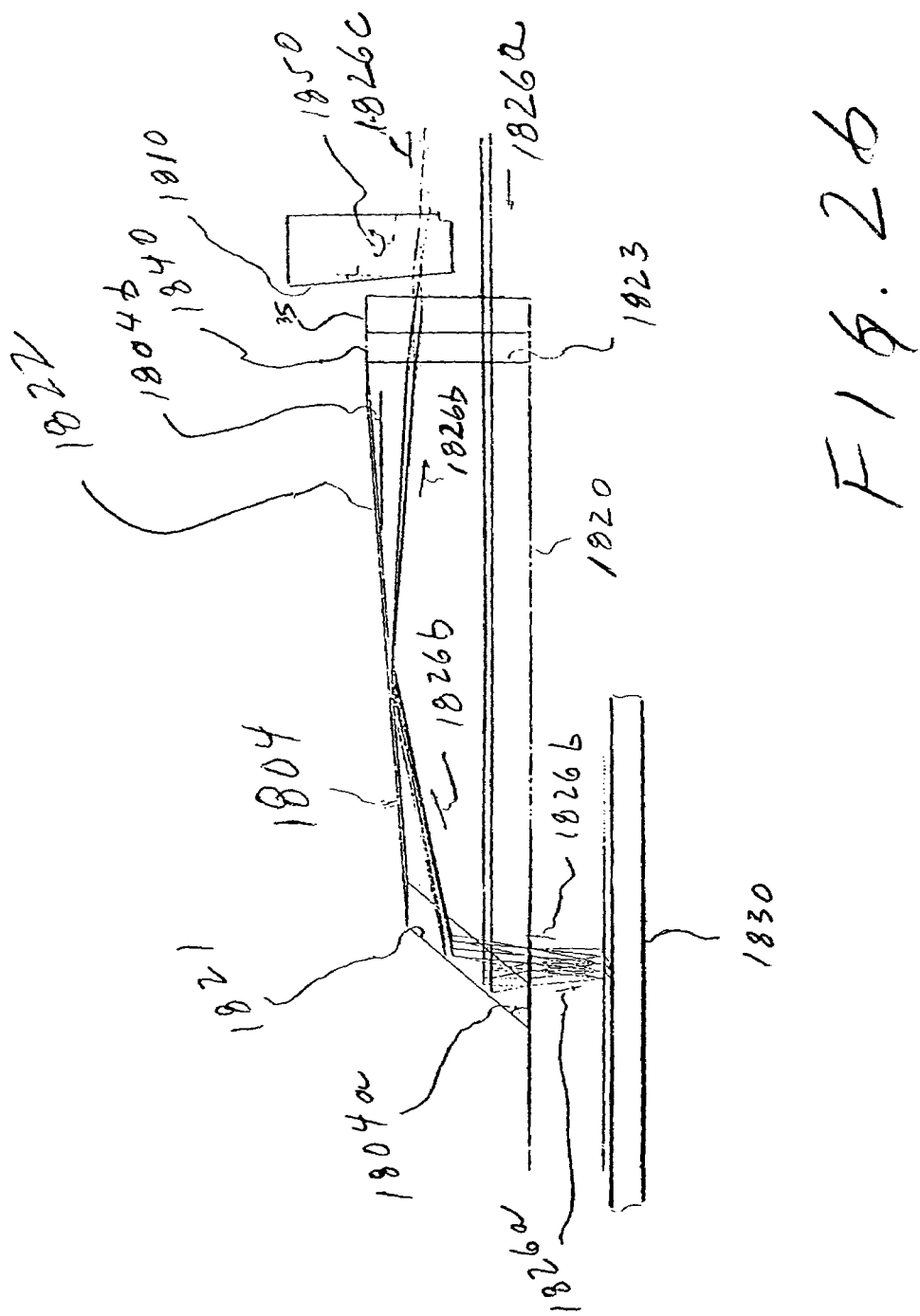
FIG. 26 is side elevational view of a portion of the reconfigurable multifunctional optical device of FIG. 40.

In FIG. 26, the input light rays 1826a first pass through the λ/4 wave plate 35 and the λ/9 wave plate 1840. The input rays 1826a reflect off the back surface 1821 of the prism 1804 the micro-mirror device 1830. The rays 1826b then reflect off the micromirror device 1830 back to the back surface 1821 of the prism 1804. The rays 1826b then reflect off the top surface 1822 for a total of 4 surfaces (an even number) and passes through the front surface 1823 of the prism 1804. The rays 1826b then pass back through the λ/4 wave plate 35 and the λ/9 wave plate 1840 to the wedge 1810. The wedge 1810 redirects the output rays 1826c to the receive pigtail 1802 (FIG. 24 of the dual fiber pigtails 1802. As shown by arrows, the wedge 1810 may be pivoted about its long axis 1850 during assembly to slightly steer the output beam 1826c to the receive pigtail 1802 with minimal optical loss by removing manufacturing tolerances of the chisel prism.

In FIG. 25, the prism 1804 (with wave plates 35, 1840 mounted thereto) and the micro-mirror device 1830 are mounted or secured in fixed relations to each other. The prism 1804 and micro-mirror device 1830 are tilted a predetermined angle off the axis of the input beam 614 (e.g., approximately 9.2 degrees) to properly direct the input beam onto the micromirrors of the micromirror device, as described hereinbefore. The wedge 1810 however is perpendicular to the axis of the input beam 1826a. Consequently, the receive pigtail of the dual fiber pigtail 1802 is rotated a predetermined angle (approximately 3 degrees) from a vertically aligned position with the transmit pigtail. Alternatively, the wedge 1810 may be rotated by the same predetermined angle as the prism and the micromirror device (e.g., approximately 9.2 degrees) from the axis of the input beam. As a result, the receive pigtail of the dual pigtail assembly 1802 may remain vertically aligned with transmit pigtail.

FIGS. 27*a* and 27*b* illustrate a technique to compensate for this diffraction effect introduced by the micromirror array 100, described hereinbefore. As shown, each optical channel 14 is dispersed onto the micro-mirrors array 100 along the spectral axis or direction 86 such that each optical channel or group of optical channels are spread over a plurality of micro-mirrors.

FIG. 27*a* illustrates the case where a grating order causes the shorter wavelength light to hit a part of the micro-mirror array 100 that is closer than the section illuminated by the longer wavelengths. In this case the Fourier or bulk lens 28 is placed at a distance "d" from the grating 30 that is shorter than focal length "f" of the Fourier lens 28. For example, the distance "d" may be approximately 71 mm and the focal length may be approximately 82 mm. It may be advantageous to use this configuration if package size is limited, as this configuration minimizes the overall length of the optical train.

FIG. 27*b* illustrates the case where the grating order causes the longer wavelengths to hit a part of the micromirror array 100 that is closer than the section illuminated by the shorter wavelengths. In this case the Fourier lens 28 is placed a distance "d" from the grating 30 that is longer than focal length "f" of the Fourier lens 28. This configuration may be advantageous to minimize the overall area illuminated by the dispersed spectrum on the micromirror array.

The Scope of the Invention

While the micro-mirrors 84 may switch discretely from the first position to the second position,. as described hereinabove, the micro-mirrors may move continuously (in an "analog" mode) or in discrete steps between the first position and second position. In the "analog" mode of operation the micro-mirrors can be can be tilted in a continuous range of angles. The ability to control the angle of each individual mirror has the added benefit of much more attenuation resolution than in the digital control case. In the "digital" mode, the number of micro-mirrors 84 illuminated by each channel determines the attenuation step resolution. In the "analog" mode, each mirror can be tilted slightly allowing fully continuous attenuation of the return beam. Alternatively, some combination of micro-mirrors may be switched at a predetermined or selected pulse width modulation to attenuate the optical channel or band.

One will appreciate though that the diffraction grating 24 and bulk lens 28 may be designed to reflect and focus any input channel or group of input channels with any desired cross-sectional geometry, such as elliptical, rectangular, square, polygonal, etc.

The embodiments of the present invention described hereinbefore include a common spatial light modulator 30 and other optical components, namely a collimating lens 22, a mirror 26, a diffraction grating 24 and a bulk lens 28. The present invention, however, contemplates having separate and distinct components that image onto a common spatial light modulator. One should therefore appreciate that any of the optical devices referenced herein may be combined with any other optical devices referenced herein, including any alternative embodiments, using a common spatial light modulator and/or other common optical components.

While the embodiments of the present invention described hereinbefore describe multi-functional devices wherein the functions of each device operate independent of the others, one will appreciate that the present invention contemplates interconnecting the inputs and outputs of the separate devices to provide another level of functionality, similar to that described for FIG. 10.

One should also appreciate that the only limit on the number of multifunctional device utilizing a single spatial light modulator is the number of pixels per channel that provide the required per channel attenuation or switching variation or the required channel plan independence.

Although the invention has been described as using an array of digital micro-mirrors to implement the pixelating device in the embodiments shown herein, it should be understood by those skilled in the art that any pixelating device that provides pixelated optical signal processing may be used, as described further below. Further, instead of using micro-mirrors with two reflective states or angles of reflection (e.g., +/−10 deg) as a pixel that reflects a portion of the light beam, the pixels may have one reflective state and the other state may be absorptive or transmissive. Alternatively, instead of the pixel having at least one state being reflective (which may provide other design advantages), the pixel may have one state being transmissive and the other state being absorptive. Alternatively, the pixel may have two transmissive or partially transmissive states that refract the incoming light out at two different angles. For each of various pixelating devices, the optics surrounding the pixelating device would be changed as needed to provide the same functions as that described for each of the embodiments herein for the different type of pixelated optical signal processing used.

Also, instead of the pixels having a square, diamond or rectangular shape, the pixels may have any other two or three-dimensional shapes, i.e., circle, oval, sphere, cube, triangle, parallelogram, rhombus, trapezoid.

The spatial light modulator is shown and described herein as a DMD device; however, the scope of the invention is intended to include other types of light modulator devices. For example, the spatial light modulator may also include a pixelating device, based on, for example, liquid crystal technology, such as a liquid crystal display (LCD). An LCD may provide a device having either one absorptive state and one reflective state, or one absorptive state and one transmissive state. The underlying principle of an LCD is the manipulation of polarized light (i.e., an optical channel). For example, the polarized light may be rotated by 90 degrees in one state of the liquid crystal and not rotated in another state. To provide an LCD having one absorptive state and one transmissive state, a polarizer is provided at each side of the liquid crystal, such that the polarization angles of the polarizers are offset by 90 degrees. A mirror can be added at one end to provide an LCD having one absorptive state and one reflective state.

One example of having a reflective state and a transmissive state is a variation on existing bubble jet technology currently produced by Agilent and Hewlett-Packard Co., and described in U.S. Pat. Nos. 6,160,928 and 5,699,462, respectively. In that case, when the bubble is in one state, it has total internal reflection; and when in the other state, it is totally transmissive. Also in that case, the pixels may not be square but circular or oval.

One example of having a transmissive state and an absorptive state is Heterojunction Acoustic Charge Transport (HACT) Spatial Light Modulator (SLM) technology, such as that described in U.S. Pat. Nos. 5,166,766, entitled "Thick Transparent Semiconductor Substrate, Heterojunction Acoustic Charge Transport Multiple Quantum Well Spatial Light Modulator", Grudkowski et al and 5,158,420, entitled "Dual Medium Heterojunction Acoustic Charge Transport Multiple Quantum Well Spatial Light Modulator" to Grudkowski et al, provided the material used for the HACT SLM will operate at the desired operational wavelength. In that case, the pixels may be controlled by charge packets that travel along a surface acoustic wave that propagates along the device, where the size of the charge controls the optical absorption.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

We claim:

1. A reconfigurable multifunctional optical device comprising:
    an optical arrangement for receiving a first optical input signal and a second optical input signal, each of the first and second optical input signals having optical bands or channels, the optical arrangement having a free optics configuration with a light dispersion element for spreading each of the first and second optical input signals into respective optical bands or channels on separate portions of a spatial light modulator having an array of micromirrors and being programmable to perform separate optical functions on each of the first and second optical signals;
    the spatial light modulator having a first set of micromirrors programmed to perform a first overall optical function on the first optical input signal, and having a second set of micromirrors programmed to perform a second overall optical function on the second optical input signal, wherein the first overall optical function and second overall optical function are different.

2. A reconfigurable multifunctional optical device according to claim 1, wherein the separate optical functions include reflecting the first and second optical input signals off separate non-overlapping areas on the spatial light modulator.

3. A reconfigurable multifunctional optical device according to claim 1, wherein the separate optical functions include optical switching, conditioning or monitoring functions such as either an optical add/drop multiplexer function, an optical channel monitor function, an optical cross-connect function, an optical interleaver/deinterleaver, an optical filtering function, or any some combination thereof.

4. A reconfigurable multifunctional optical device according to claim 1, wherein the light dispersion elements include either a diffraction grating, an optical splitter, a holographic device, a prism, or a combination thereof.

5. A reconfigurable multifunctional optical device according to claim 4, wherein the diffraction grating is a blank of polished fused silica or glass with a reflective coating having a plurality of grooves either etched, ruled or suitably formed thereon.

6. A reconfigurable multifunctional optical device according to claim 1, wherein the light dispersion element is oriented to spread the at least two optical input signals along a spectral axis, wherein the spectral axis is parallel to the tilt axis of the micromirrors of the spatial light modulator.

7. A reconfigurable multifunctional optical device according to claim 6, wherein the switching algorithm is based on the wavelength of the at least two optical input signals.

8. A reconfigurable multifunctional optical device according to claim 7, wherein the one or more optical portions provide one optical input signal, the other optical input signal, or a combination thereof as different channels having different wavelengths on the spatial light modulator.

9. A reconfigurable multifunctional optical device according to claim 8, wherein the different channels have a desired cross-sectional geometry, including elliptical, rectangular, square or polygonal.

10. A reconfigurable multifunctional optical device according to claim 8, wherein the spatial light modulator is configured so one group of channels is spaced at 100 GHz and another group of channels is spaced at 50 GHz.

11. A reconfigurable multifunctional optical device according to claim 6, wherein the light dispersion element is oriented to spread the optical signal along a spectral axis, wherein the spectral axis is perpendicular to the tilt axis of the micromirrors of the spatial light modulator.

12. A reconfigurable multifunctional optical device according to claim 1, wherein the spatial light modulator includes an array of micro-mirrors having a multiplicity of micro-mirrors that are separately controllable for tilting on an axis depending on a control signal in accordance with a switching algorithm.

13. A reconfigurable multifunctional optical device according to claim 1, wherein the at least two optical input signals include a wavelength division multiplexed (WDM) optical input signal having a plurality of wavelengths and a corresponding plurality of optical bands or channels, each optical band or channel reflecting off a respective group of micro-mirrors of the micro-mirror device.

14. A reconfigurable multifunctional optical device according to claim 13, wherein the respective group of micro-mirrors are collectively tilted to reflect channels in the at least two optical input signals.

15. A reconfigurable multifunctional optical device according to claim 1, wherein the different optical characteristics includes different channel spacing, the shape of the light beam, the center wavelength of the light beam of the at least one optical signal, or some combination thereon.

16. A reconfigurable multifunctional optical device according to claim 1, wherein each micro-mirror is tiltable in either a first position or a second position along an axis either substantially parallel to the spectral axis of the at least two optical input signals, parallel to the spatial axis of the at least two optical input signals, or at an angle of 45 degrees in relation to the spatial axis.

17. A reconfigurable multifunctional optical device according to claim 1, wherein the optical arrangement includes one or more optical portions that provide the at least two optical input signals to the spatial light modulator, and also provide reflected optical signals depending on the first optical function and the second optical function.

18. A reconfigurable multifunctional optical device according to claim 17, wherein the one or more optical portions include either one or more circulators, one or more waveguides, or a combination thereof.

19. A reconfigurable multifunctional optical device according to claim 18, wherein the one or more circulators includes a pair of circulators.

20. A reconfigurable multifunctional optical device according to claim 18, wherein the one or more waveguides includes a pair of capillary tubes.

21. A reconfigurable multifunctional optical device according to claim 18, wherein the one or more circulators includes a three port circulator.

22. A reconfigurable multifunctional optical device according to claim 17, wherein the one or more optical portions include a pair of optical portions, including one optical portion for providing one optical input signal to the spatial light modulator, and another optical portion for providing another optical input signal to the spatial light modulator.

23. A reconfigurable multifunctional optical device according to claim 17, wherein the one or more optical portions include a collimator, a reflective surface, the dispersion element, a bulk lens, or a combination thereof.

24. A reconfigurable multifunctional optical device according to claim 23, wherein the collimator includes either an aspherical lens, an achromatic lens, a doublet, a GRIN lens, a laser diode doublet, or a combination thereof.

25. A reconfigurable multifunctionall optical device according to claim 23, wherein the reflective surface includes a mirror.

26. A reconfigurable multifunctional optical device according to claim 23, wherein the bulk lens includes a Fourier lens.

27. A reconfigurable multifunctional optical device according to claim 23, wherein the lens distance between the spatial light modulator and the bulk lens is greater than the focal length of the bulk lens.

28. A reconfigurable multifunctional optical device according to claim 23, wherein the lens distance between the spatial light modulator and the bulk lens is less than the focal length of the bulk lens.

29. A reconfigurable multifunctional optical device according to claim 17, wherein the one or more optical portions include one or more optical PDL mitigating devices for minimizing polarization dependence loss (PDL).

30. A reconfigurable multifunctional optical device according to claim 29, wherein one optical PDL mitigating device is arranged between a waveguide and a grating in the optical arrangement, and another optical PDL mitigating device is arranged between a grating and the spatial light modulator.

31. A reconfigurable multifunctional optical device according to claim 29, wherein the one or more optical PDL mitigating devices include a pair of optical PDL mitigating devices.

32. A reconfigurable multifunctional optical device according to claim 29, wherein the one or more optical PDL mitigating devices includes one optical PDL mitigating device having a polarization splitter for splitting each channel into a pair of polarized light beams and a rotator for rotating one of the polarized light beams of each optical channel.

33. A reconfigurable multifunctional optical device according to claim 32, wherein the one or more optical PDL mitigating devices includes another optical PDL mitigating device having a rotator for rotating one of the previously rotated and polarized light beams of each optical channel and a polarization splitter for combining the pair of polarized light beams of each channel.

34. A reconfigurable multifunctional optical device according to claim 29, wherein the one or more optical PDL mitigating devices includes a λ/4 plate.

35. A reconfigurable multifunctional optical device according to claim 17, wherein the optical arrangement includes a chisel prism having multiple faces for modifying the direction of the at least one optical signal.

36. A reconfigurable multifunctional optical device according to claim 35, wherein the multiple faces include at least a front face, first and second beveled front faces, a rear face, a top face and a bottom face.

37. A reconfigurable multifunctional optical device according to claim 35, wherein optical light from first or second optical portions passes through one or more faces of the chisel prism, reflects off one or more internal surfaces of the chisel prism, reflects off the spatial light modulator, again reflects off the one or more internal surfaces of the chisel prism, and passes back to the first or second optical portions.

38. A reconfigurable multifunctional optical device according to claim 1, wherein the diffraction grating has a low PDL.

39. A reconfigurable multifunctional optical device according to claim 1, wherein
the reconfigurable multifunctional optical device includes an optical add/drop multiplexer configuration; and
the dispersion element spreads at least one optical signal and an optical add signal so that each optical band or channel is reflected by one respective plurality of micro-mirrors of the spatial light modulator to selectively add or drop the one or more optical bands or channels to and/or from the at least one optical signal.

40. A reconfigurable multifunctional optical device according to claim 1, wherein
the reconfigurable multifunctional optical device includes an optical cross-connect configuration; and
the light dispersion element spreads two or more optical input signals so that each optical band or channel is reflected by one respective plurality of micro-mirrors of the spatial light modulator to selectively switch the one or more optical bands or channels between the two or more optical input signals.

41. A reconfigurable multifunctional optical device according to claim 1, wherein the reconfigurable multifunctional optical device includes an optical channel monitor configuration having a light detector, the light dispersion element directing one or more reflected optical bands or channels reflected by one respective plurality of micro-mirrors of the spatial light modulator to provide an optical output signal, and the light detector detecting the one or more reflected optical bands or channels in the optical output signal.

42. A reconfigurable multifunctional optical device according to claim 1, wherein
the reconfigurable muitifunctional optical device includes an interleaver/deinterleaver configuration; and
the light dispersion element spreads two or more optical input signals so that each optical band or channel is reflected by one respective plurality of micro-mirrors of the spatial light modulator to selectively either combine two respective sets of at least one optical band or channel into one optical output signal, or de-combine one set of the at least one optical band or channel into two optical output signals each having a different set of the at least one optical band or channel.

43. A reconfigurable multifunctional optical device according to claim 1, wherein the reconfigurable multifunctional optical device includes a chromatic dispersion compensation configuration for receiving an optical signal having one or more optical channels; and the spatial light modulator selectively reflects a respective spectral portion of a plurality of spectral bands or sections of the one or more channels from one respective plurality of micro-mirrors of the spatial light modulator to compensate each channel for chromatic dispersion.

44. A reconfigurable multifunctional optical device according to claim 1, wherein the reconfigurable multifunctional optical device includes an optical blocking filter for receiving an optical input signal having one or more optical bands or channels; and the spatial light modulator selectively deflects the one or more optical bands or channels from one respective plurality of micro-mirrors of the spatial light modulator to eliminate a selected band or channel or a specified selection of bands or channels from the optical signal provided along an optical return path.

45. A reconfigurable multifunctional optical device according to claim 1, wherein one optical function is performed on one optical input signal for providing an optical output signal, and wherein a second optical function is performed on the optical output signal.

46. A reconfigurable multifunctional optical device according to claim 1, wherein the free optics configuration includes a common set of optical components for performing the separate optical functions on each optical signal.

47. A reconfigurable multifunctional optical device according to claim 1, wherein the optical arrangement disperses optical channels so they are substantially separated.

48. A reconfigurable multifunctional optical device according to claim 1, wherein the optical arrangement disperses optical channels so they are substantially overlapping.

49. A reconfigurable multifunctional optical device according to claim 1, wherein the light dispersion element provides two or more optical return signals, each having modified optical bands or channels depending on the separate optical functions performed on each optical input signal.

50. A reconfigurable multifunctional optical device according to claim 1, wherein said spatial light modulator is reconfigurable by modifying a switching algorithm that drives the array of micro-mirrors to change the first overall optical function to a different overall optical function, and/or the second overall optical function to a different overall optical function.

51. A reconfigurable multifunctional optical device according to claim 1, wherein the spatial light modulator is selectively reconfigurable by statically or dynamically modifying a switching algorithm to accommodate different optical characteristics of the first and/or second optical input signals.

* * * * *

UNITED STATES PATENT AND TRADEMARK OFFICE
CERTIFICATE OF CORRECTION

PATENT NO. : 7,126,740 B2
APPLICATION NO. : 10/353772
DATED : October 24, 2006
INVENTOR(S) : Szczepanek et al.

It is certified that error appears in the above-identified patent and that said Letters Patent is hereby corrected as shown below:

Column 1, line 41 change "2002now" to -- 2002, now --
Column 1, line 44 change "2002now" to -- 2002, now --
Column 1, line 48 change "2002now" to -- 2002, now --
Column 1, line 52 change "2002now" to -- 2002, now --
Column 10, line 50 "60/281,019" should be -- 60/281,079 --
Column 19, line 54 "ad" should be -- as --
Column 20, line 47 change "(FIG. 24" to -- (FIG. 24) --
Column 21, line 34 "." should be deleted
Column 21, line 38 second occurrence of "can be" should be deleted Signed and Sealed this Sixteenth Day of March, 2010

David J. Kappos
*Director of the United States Patent and Trademark Office*